April 21, 1931. C. H. GREEN 1,801,343
MULTIRECORD CONTROLLER
Filed Jan. 11, 1926 12 Sheets-Sheet 1
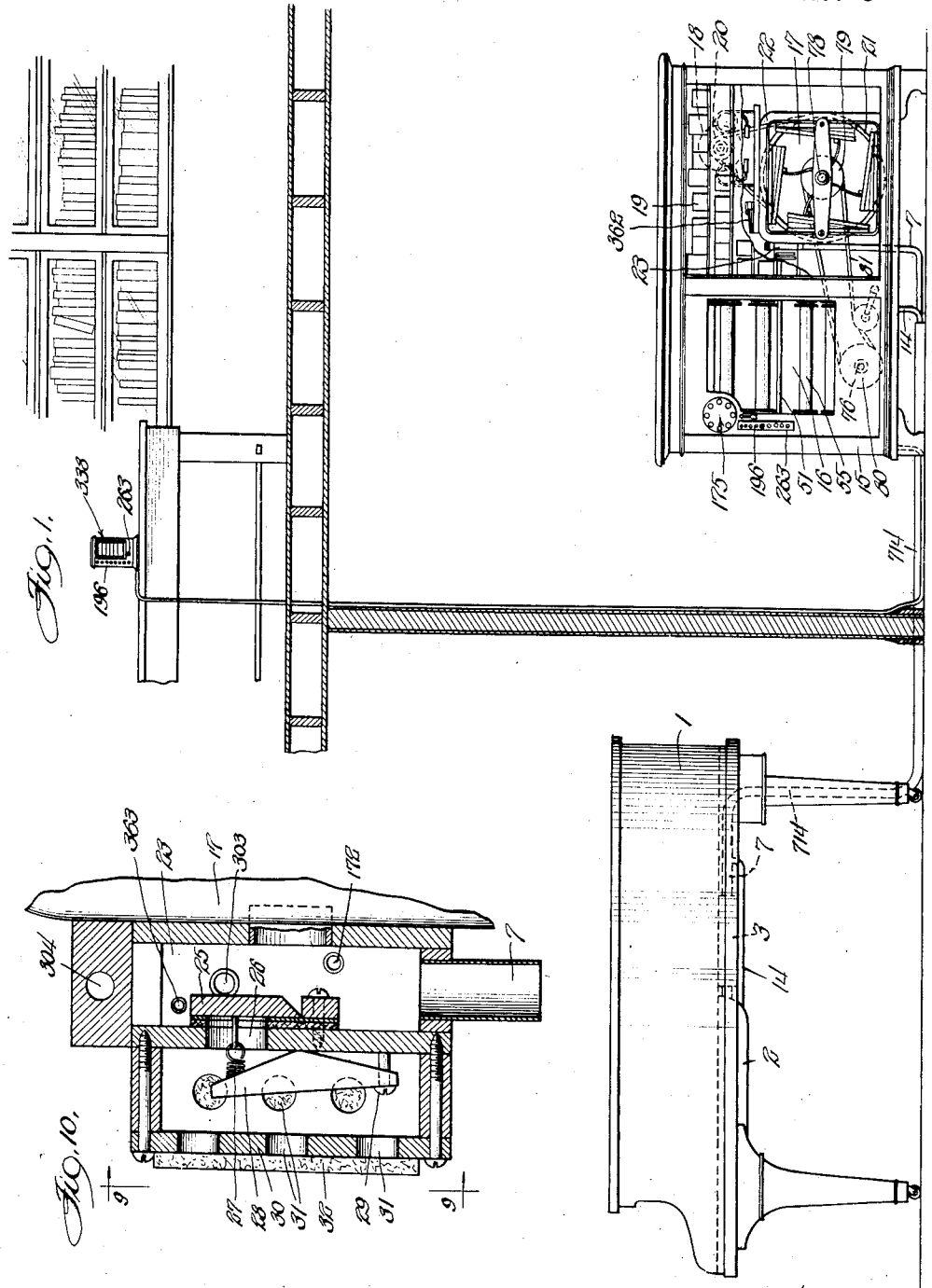
Witness:
W. K. Olson
Inventor:
Clifford H. Green
Jones, Addington,
Ames, & Seibold Attys

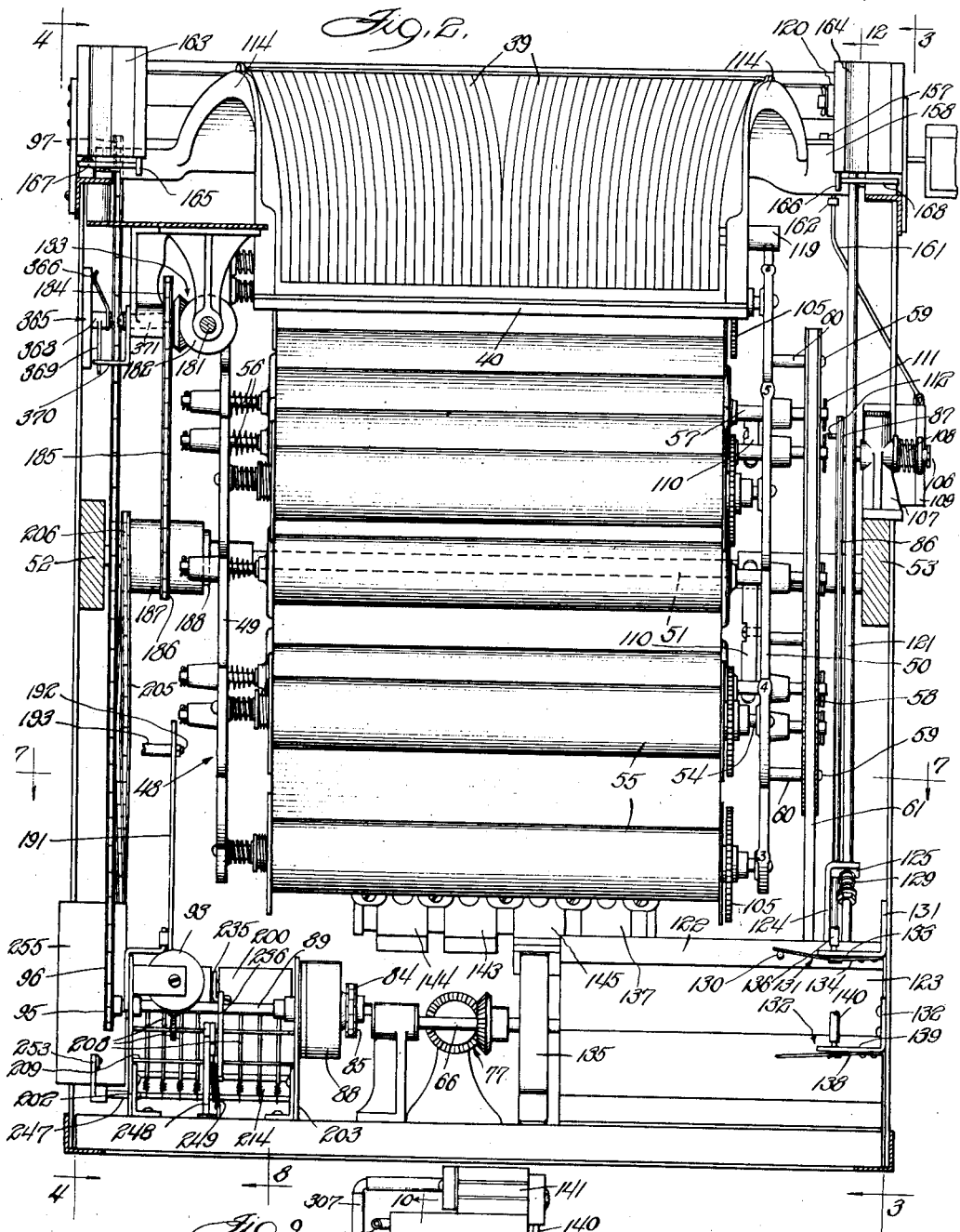

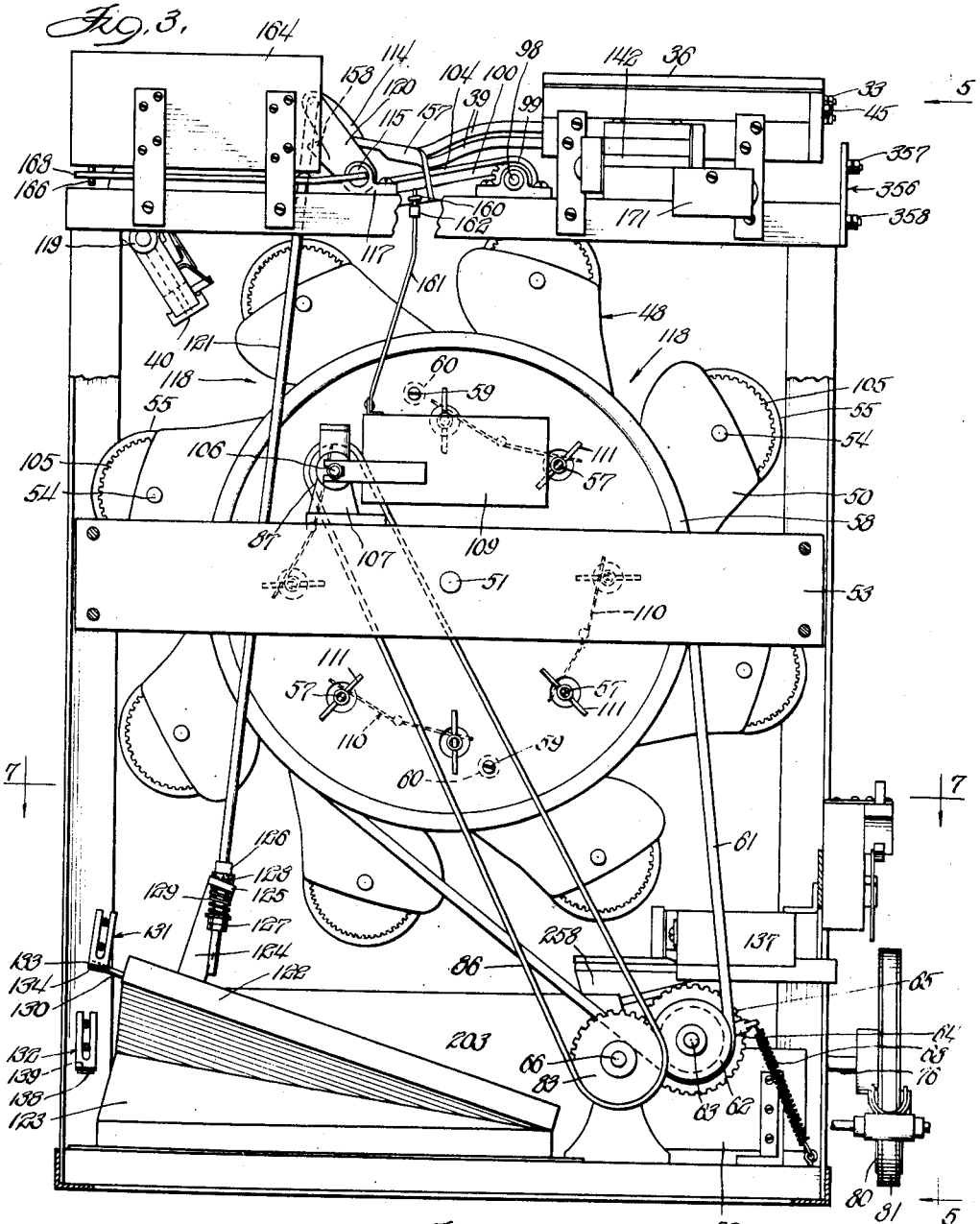

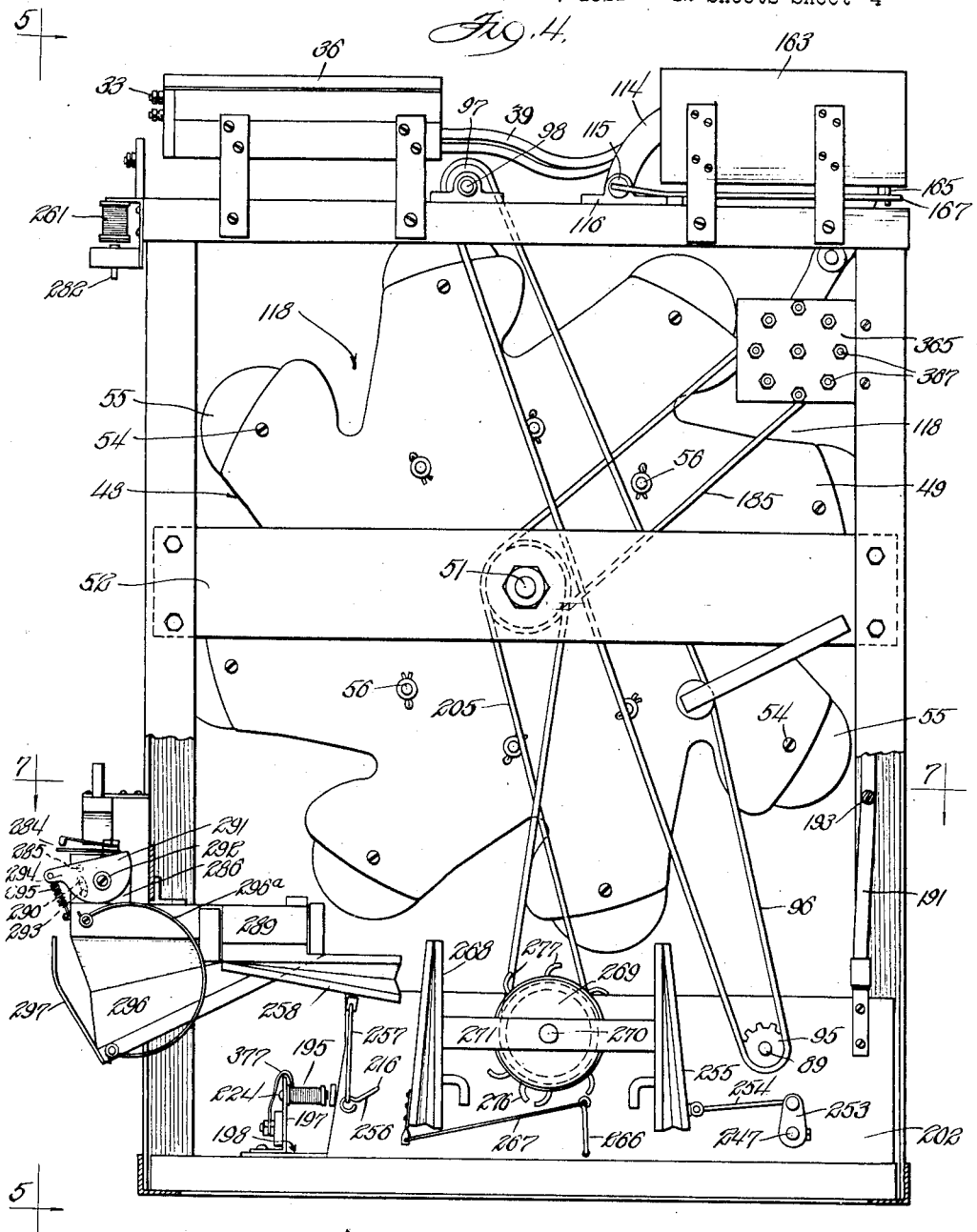

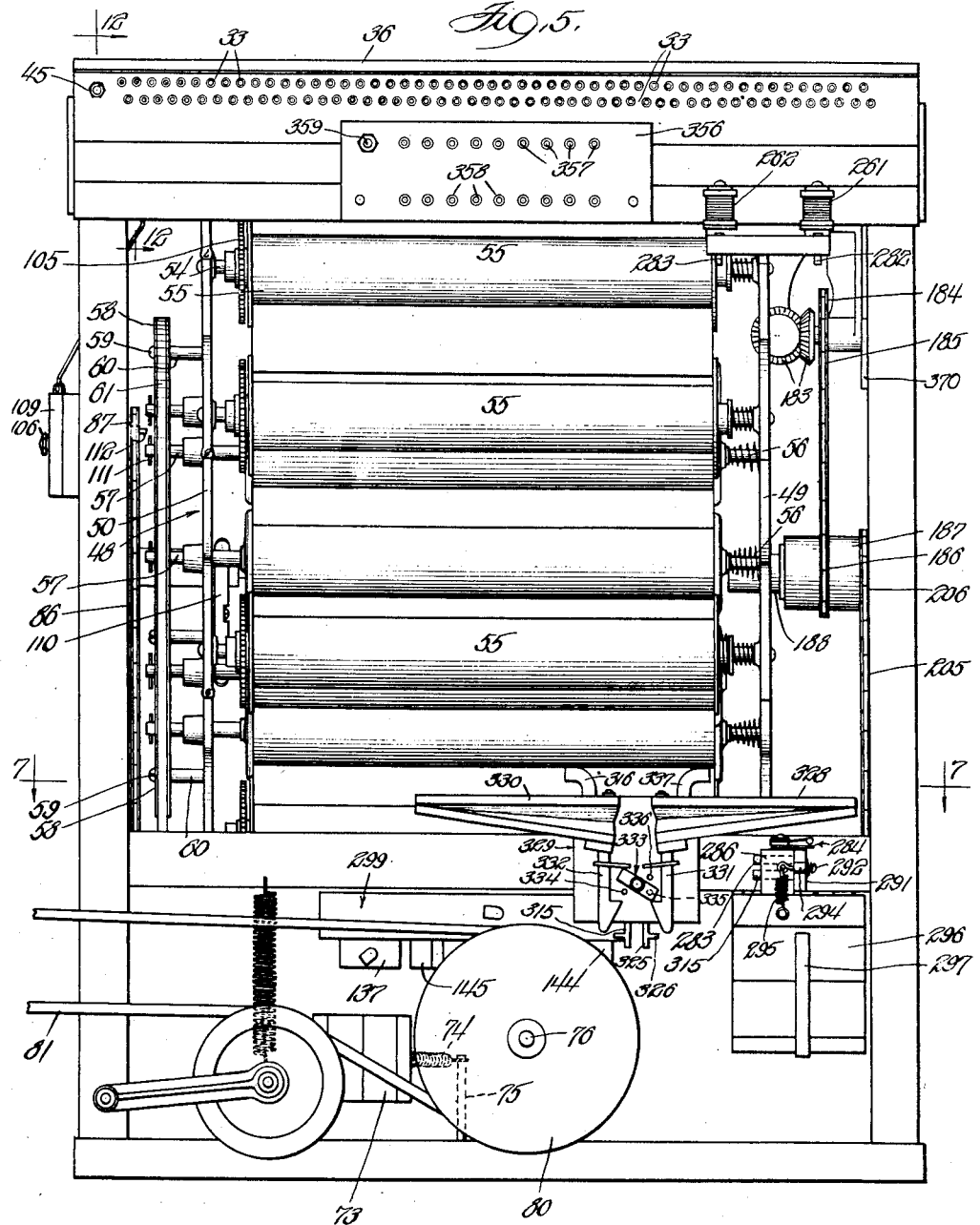

April 21, 1931.  C. H. GREEN  1,801,343
MULTIRECORD CONTROLLER
Filed Jan. 11, 1926   12 Sheets-Sheet 6
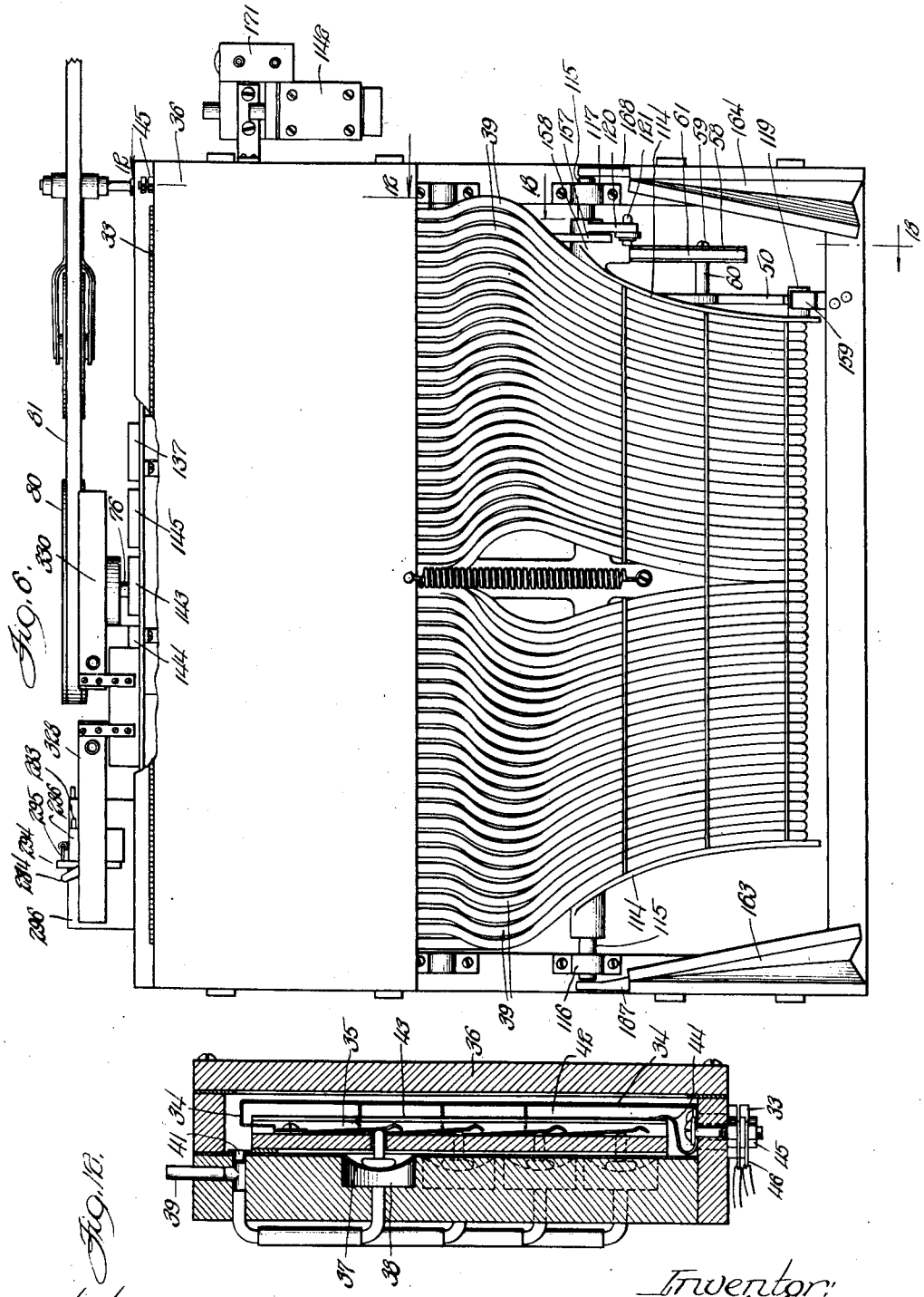

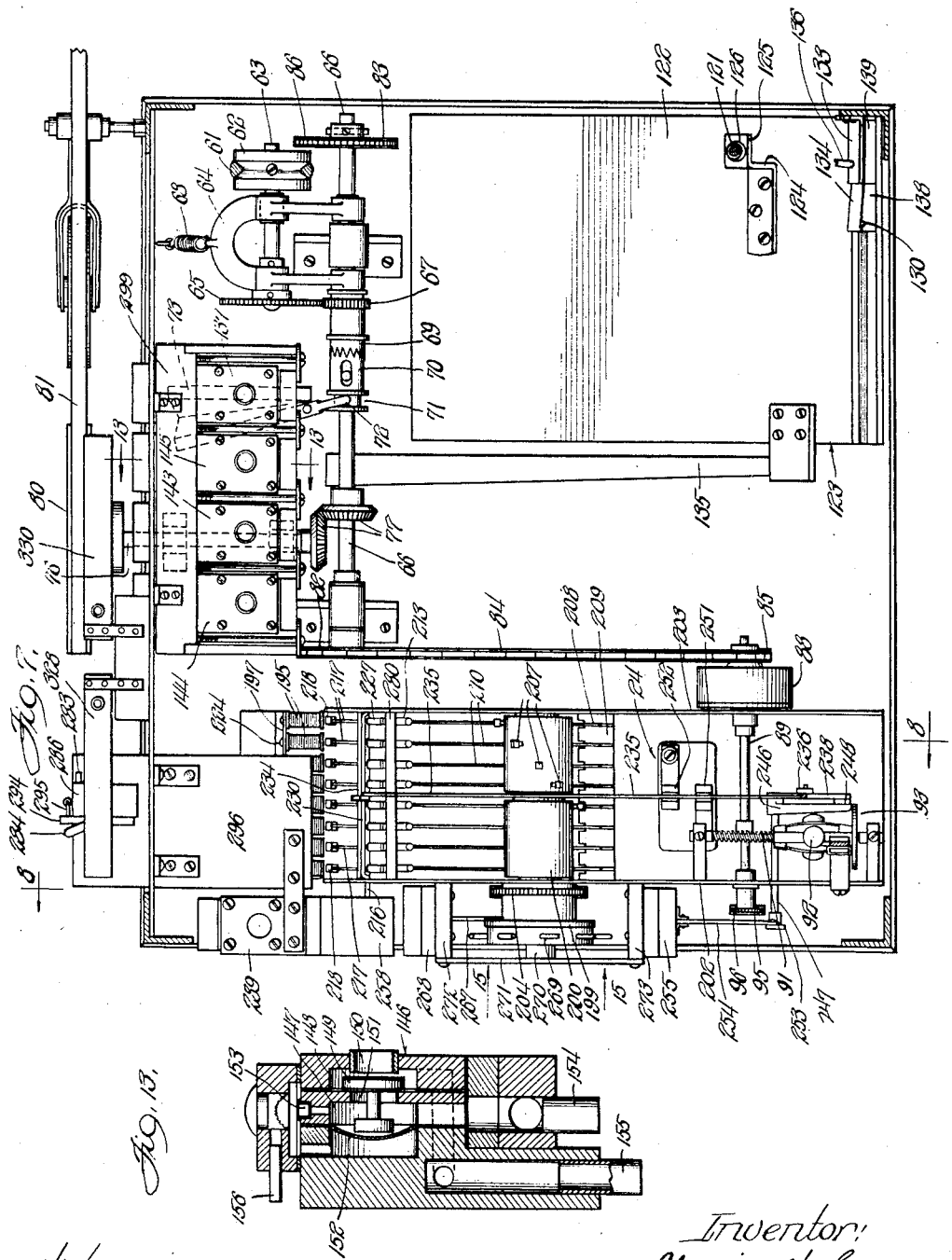

April 21, 1931.  C. H. GREEN  1,801,343
MULTIRECORD CONTROLLER
Filed Jan. 11, 1926  12 Sheets-Sheet 8
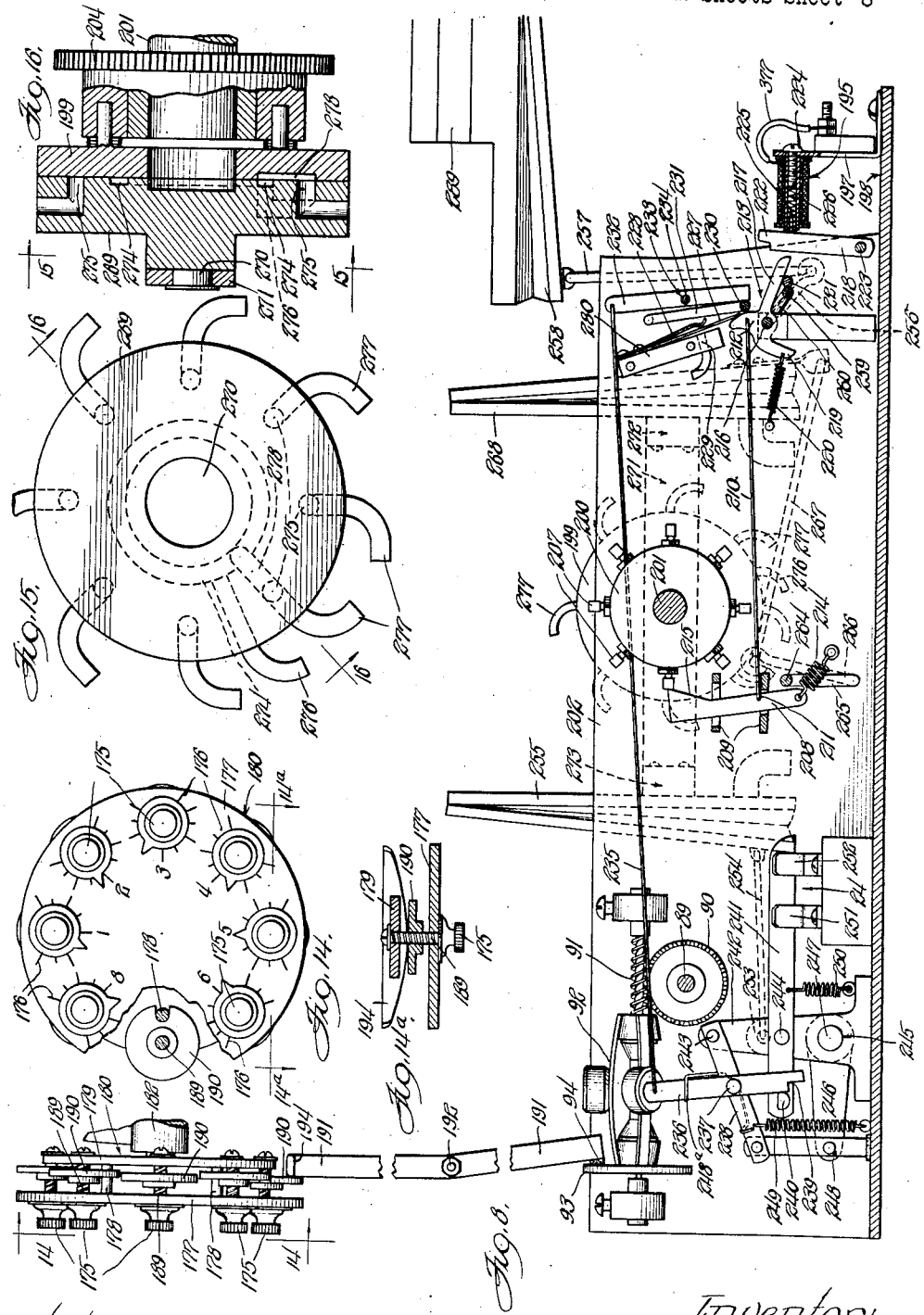

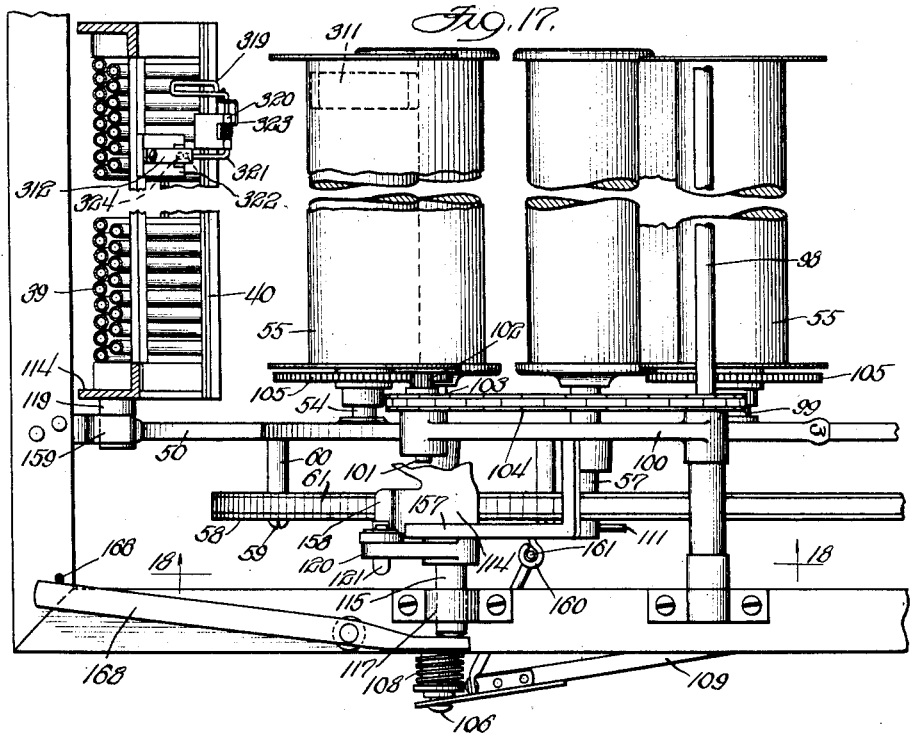

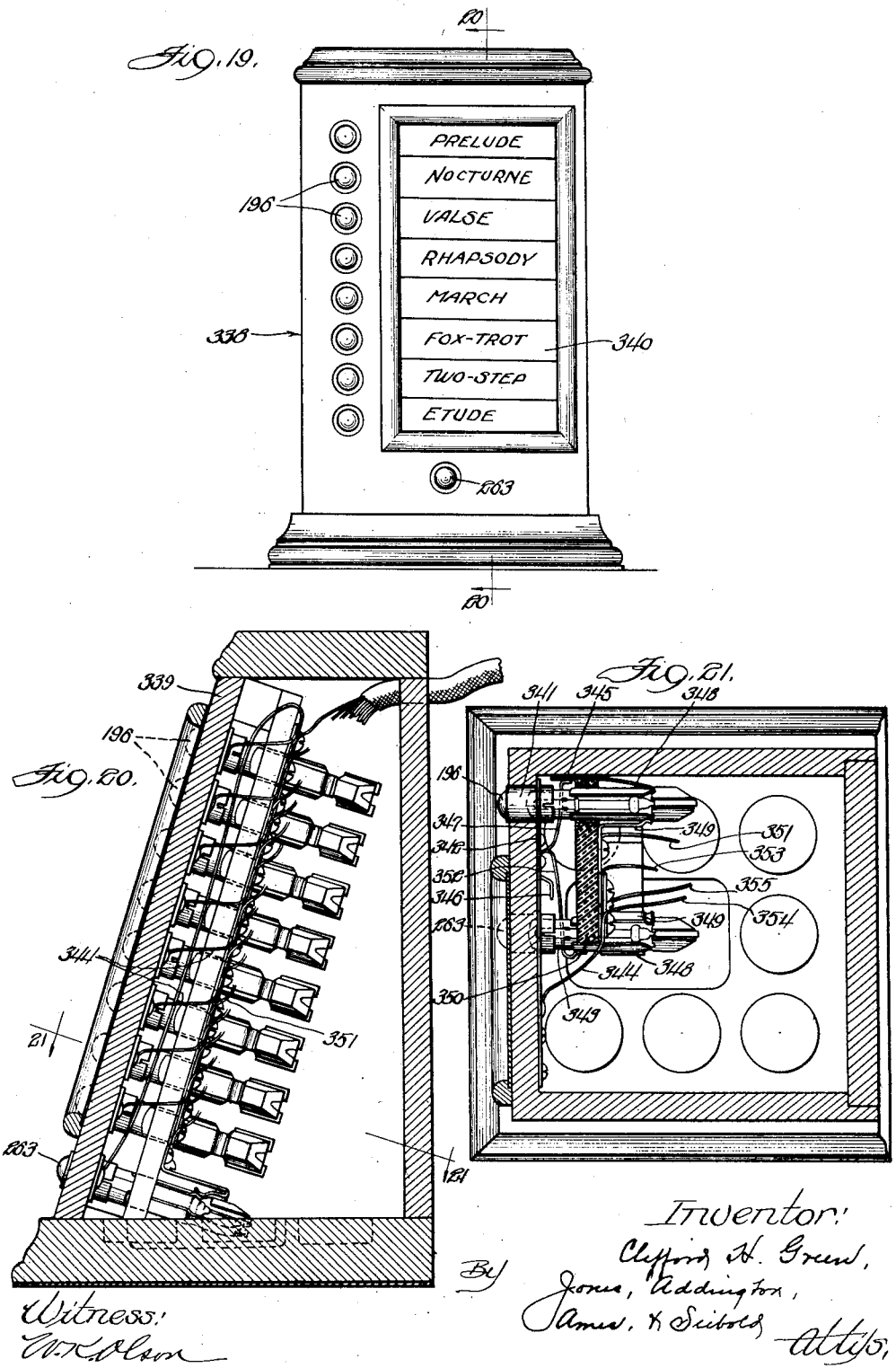

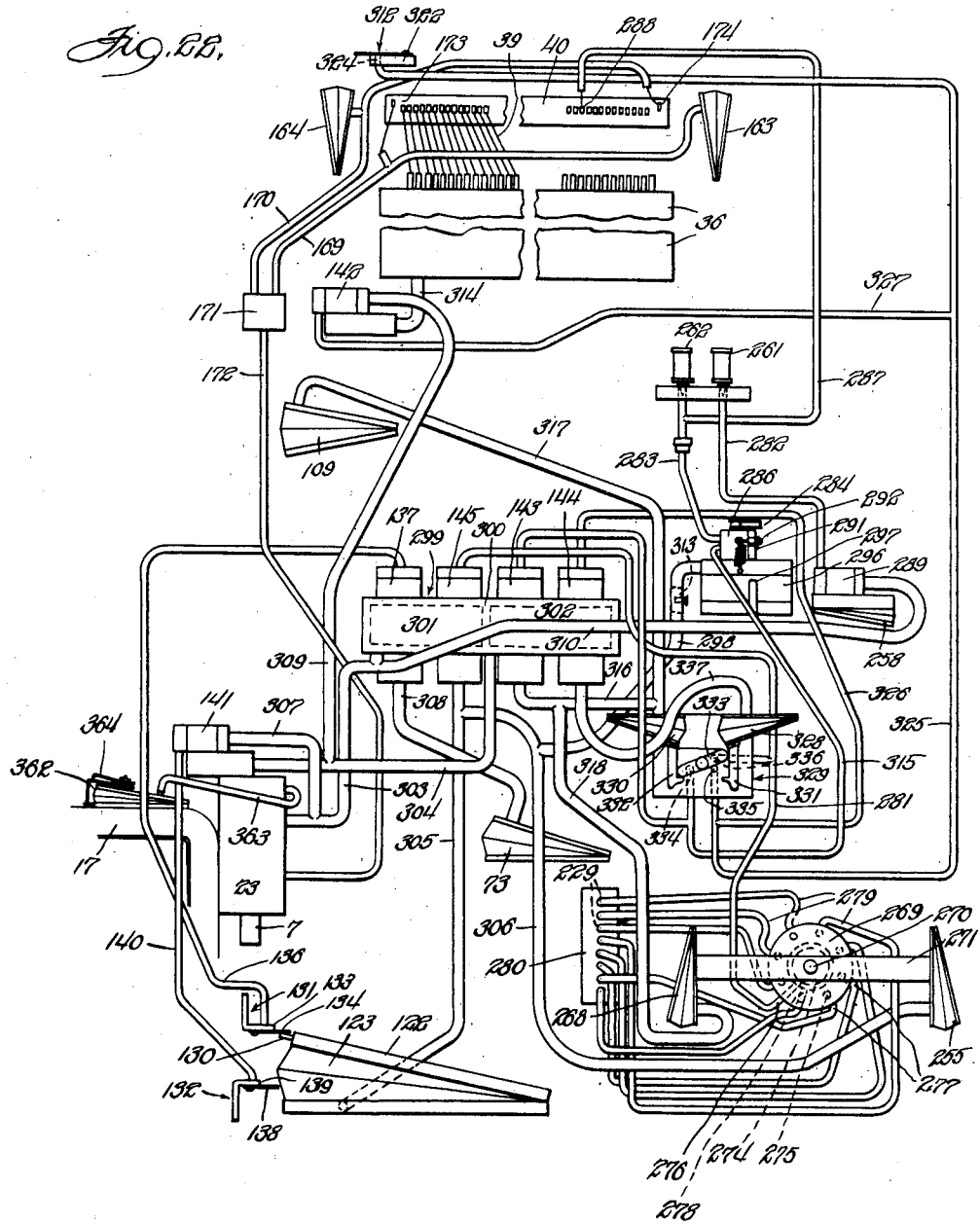

April 21, 1931.  C. H. GREEN  1,801,343
MULTIRECORD CONTROLLER
Filed Jan. 11, 1926   12 Sheets-Sheet 12
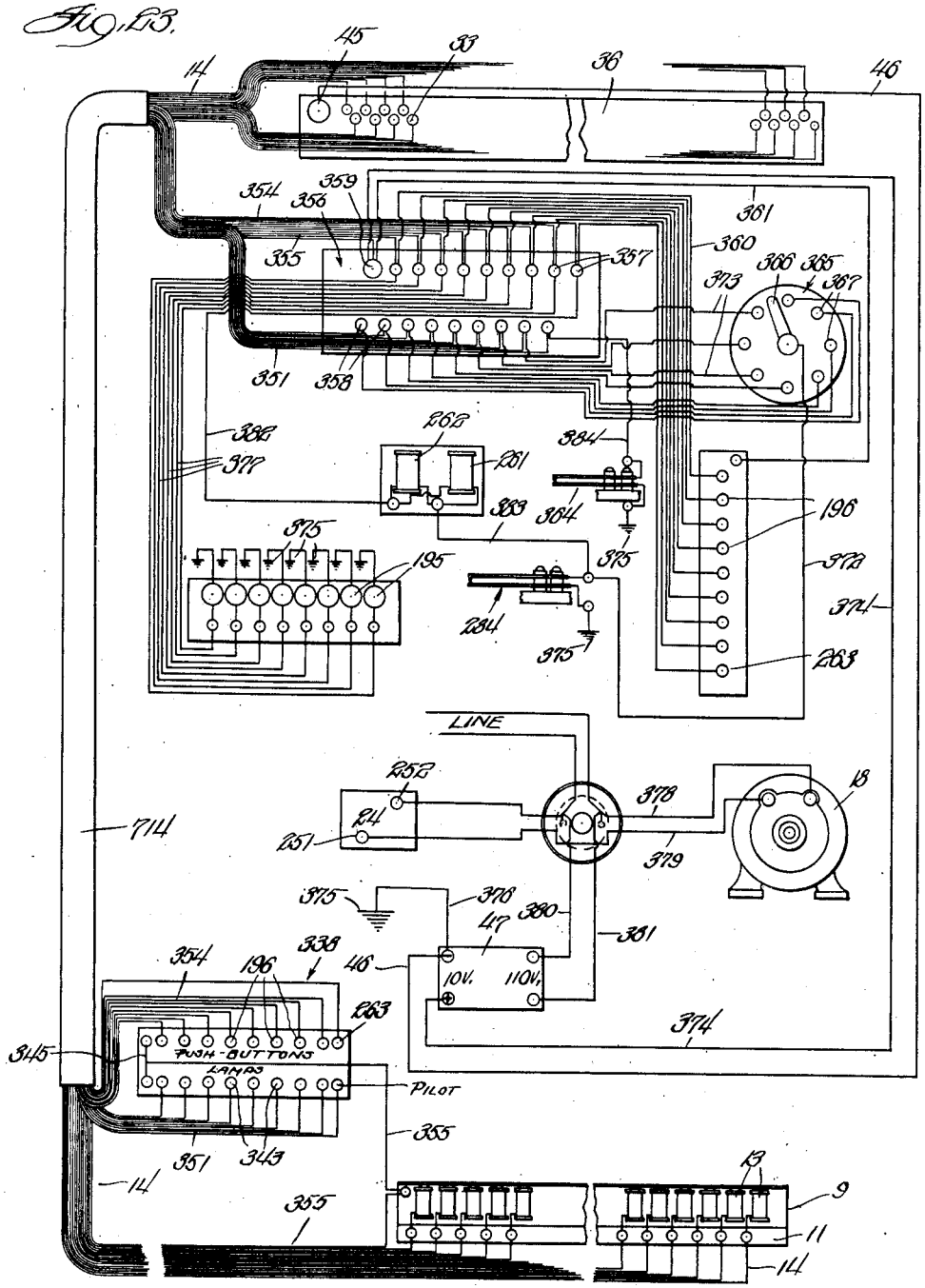

Patented Apr. 21, 1931

1,801,343

UNITED STATES PATENT OFFICE

CLIFFORD H. GREEN, OF GRAND RAPIDS, MICHIGAN, ASSIGNOR, BY MESNE ASSIGNMENTS, TO GRAND RAPIDS TRUST COMPANY AND HARRY M. BAXTER, CORECEIVERS FOR AUTOMATIC MUSICAL INSTRUMENT COMPANY, OF GRAND RAPIDS, MICHIGAN, A CORPORATION OF DELAWARE

MULTIRECORD CONTROLLER

Application filed January 11, 1926. Serial No. 80,601.

This invention relates to multirecord controllers.

One object of the invention is to provide improved mechanism for controlling the operation of an automatic musical instrument, which mechanism may be separate and remote from the musical instrument to be controlled, and by means of which any desired one of a plurality of records may be selectively brought into operation to control the playing of the instrument.

Another object of the invention is to provide an arrangement of the mechanism through which the aforesaid control is effected which will not cause or require any changes to be made in the structure or appearance of the musical instrument, which will avoid making even such changes therein as have heretofore been considered necessary in providing musical instruments with automatic playing mechanism, and which will not interfere with the tonal qualifications of the musical instrument, in which arrangement such parts of the automatic mechanism as are not too intimately concerned with the actual movement of musical instrument parts, together with such parts as require manipulation, adjustment, and lubrication, are grouped together, separate from the musical instrument (and remote therefrom, if desired), to provide for convenient access thereto, and in which arrangement the parts of the mechanism directly connected with removably supporting the plurality of records are so arranged that each record may be easily placed in proper position, identified, and removed or exchanged.

A further and important object of the invention is to provide an improved type of controller-indicator, through which, by the selective actuation of one or more selecting devices, the aforesaid mechanism may be controlled to cause the playing upon the musical instrument of any desired one or more of the musical compositions represented by the aforesaid plurality of records, and through which, in a similar manner, such playing may be stopped at will and a new selection registered. A chart or program, showing the titles of the aforesaid musical compositions, is preferably arranged adjacent to such selecting devices to assist in the selection of the desired musical numbers, and the construction of the controller-indicator is such that it will serve in automatically showing whether or not the mechanism is in operation and in automatically indicating the title of the musical composition which is being played, or which is about to be played. A plurality of such controller-indicators may be employed, and either fixedly or movably connected with the controlling mechanism, as desired.

Other objects and advantages of the invention will appear from the detailed description to follow, and from the appended claims.

In the accompanying drawings,

Figure 1 is a general schematic view of the principal units embodied in and containing the invention, illustrating their connected relationship;

Fig. 2 is a front view of the controlling mechanism, with the casing omitted and certain other structural parts broken away;

Fig. 3 is a side and partly sectional view of one side of the controlling mechanism, looking in the direction of the arrows and taken upon the line 3—3 of Fig. 2;

Fig. 4 is a side and partly sectional view of the other side of the controlling mechanism, looking in the direction of the arrows and taken upon the line 4—4 of Fig. 2;

Fig. 5 is a rear view of the controlling mechanism, looking in the direction of the arrows 5—5 of Figs. 3 and 4;

Fig. 6 is a top plan view of the controlling mechanism, with certain parts broken away;

Fig. 7 is a horizontal sectional view of the controlling mechanism, taken upon the line 7—7 of Figs. 2, 3, 4 and 5;

Fig. 8 is a vertical sectional view, upon an enlarged scale, taken principally upon the line 8—8 of Figs. 2 and 7, showing the selecting, cancelling, restoring, stopping and starting, and tempo-controlling mechanisms;

Fig. 9 is a side view of the pump air-chamber and safety-valve unit, looking in the direction of the arrows 9—9 of Fig. 10, showing the connections of the several pneumatic conduits with the air-chamber and the muffler-cap covering the safety-valve inlet;

Fig. 10 is a vertical sectional view, upon an enlarged scale, taken upon the line 10—10 of Fig. 9, showing the pump air-chamber, the pneumatic conduits connected therewith, the "over-blow" or safety-valve, and the muffler-cap;

Fig. 11 is a detail view, diagrammatic in character, showing one of the magnet-rails in vertical section and its connection with a conventional form of player-action;

Fig. 12 is a vertical sectional view of the electro-pneumatic contact-box, taken upon the line 12—12 of Figs. 2, 5 and 6;

Fig. 13 is a vertical sectional view, upon an enlarged scale, taken upon the line 13—13 of Fig. 7, showing the construction of one of the controlling valve-actions;

Fig. 14 is a front view of the tempo-adjusting indexes and scales, looking in the direction of the arrows 14—14 of Fig. 8;

Fig. 14a is a horizontal sectional detail view, taken upon the line 14a—14a of Fig. 14;

Fig. 15 is a side view of the finder or selector device forming part of the record-selecting mechanism, looking in the direction of the arrows 15—15 of Figs. 7 and 16;

Fig. 16 is a sectional view of the finder or selector device, taken upon the line 16—16 of Fig. 15;

Fig. 17 is a broken, horizontal sectional view, upon an enlarged scale, taken upon the line 17—17 of Fig. 18, showing the arrangement of the gearing for driving the record takeup spools;

Fig. 18 is a broken, vertical sectional view, taken upon the line 18—18 of Figs. 6 and 17, illustrating the swinging tracker and its association with the record-holding magazine or carrier;

Fig. 19 is a front view of the controller-indicator;

Fig. 20 is a vertical sectional view of the controller-indicator, taken upon the line 20—20 of Fig. 19;

Fig. 21 is a sectional view of the controller-indicator, taken upon the line 21—21 of Fig. 20;

Fig. 22 is a diagrammatic view of the pneumatic connections; and

Fig. 23 is a diagrammatic view of the electrical connections.

The general objects of the invention have been given, but, before proceeding with the detailed description of the construction, it appears desirable to point out some of the advantages provided by the hereinafter described novel arrangement of the various parts.

Considering, first, the musical instrument, it may be explained that a type of instrument known as a "reproducing" piano has been chosen for the purpose of illustrating the present embodiment of the invention, but it is to be understood that the invention is not by any means, limited to use with instruments of this particular type, nor is it limited to the particular embodiment herein shown and described. It is designed to be employed for controlling the operation of automatic organs as well as that of automatic pianos other than of the type here chosen, and it will be obvious that even the exact construction illustrated in the drawings may be operatively associated with various types of musical instruments. It being understood, then, that the type of musical instrument here shown has been chosen for illustrative purposes only, the description of the invention will deal expressly with the peculiarities, requirements, and construction of that type of instrument, and with the association of the present embodiment of the invention therewith. Reproducing pianos are usually pneumatically operated and are usally constructed as a complete unit, housing all of the elements concerned with their automatic operation, including the record holding and driving mechanism, the air-pump, and the pump-driving electric motor, and there has been constant effort, upon the part of the manufacturers of such instruments, to conceal all of the mechanism and to reduce and muffle the sounds of its operation, so that the presence thereof will detract as little as possible from the artistic design of the instrument and so that the sounds of its operation will not annoy the listener during the rendition of a musical selection.

This invention contemplates the arrangement of a number of records ready to be selectively and automatically brought into service to control the pneumatic operation of the reproducing piano aforesaid, and it concerns the provision of a construction which will not only accommodate such an arrangement of records and provide for their convenient placement and removal without adding further mechanism to be concealed and muffled, as aforesaid, at the musical instrument, but will, in addition, provide for the arrangement, away from the musical instrument, of the major part of the automatic player-mechanism heretofore housed thereby. Reference to Figure 1 will disclose, in a general way, the manner in which the complete mechanism here involved may be arranged in three connected units which may be separately located, remote from each other, if desired. A somewhat similar arrangement has been shown and broadly claimed in a co-pending application, Serial Number 668,266, filed October 13th, 1923, but the arrangement hereinafter described differs in many important respects therefrom and introduces many decided improvements thereover. One of such differences, which will be readily recognized as constituting a decided improvement, is that the present arrangement employs but one air-pump and one electric motor, dispensing entirely with the air-pump and pump-driving electric motor heretofore housed by the musical instrument. Another such difference is to be found in the novel arrangement of the tracker and the record-carrier, through which standard types of records may be employed and be conveniently placed in and removed from position, face side upward, upon the usual type of record-spool supports. Still another such difference resides in the novel controller-indicator which not only provides means for selectively causing any desired one or more of the plurality of records to be brought into operation to control the playing of the musical instrument, but, in addition, provides means for automatically showing whether or not the mechanism is in operation, and for automatically indicating the title of the musical compostion which is being played, or which is about to be played, and also provides means whereby the playing of the instrument may be stopped at will and all previously registered selections cancelled. These and other differences, which will appear from the detailed description to follow, involve changes in the construction, which changes in themselves constitute improvements over the construction set forth in the aforesaid co-pending application.

The present arrangement reduces to the minimum all visible and audible evidence that the piano is provided with automatic player-mechanism. By placing the record holding and driving mechanism in a unit separate from the musical instrument, provision has been made for the accommodation of enough records to furnish a satisfactory program of varied selections and the said mechanism is so disposed in said unit that it, as well as the records held and driven thereby, may be much more easily and conveniently reached than is customary or would be possible in the usual automatic musical instrument or reproducing piano and, by placing the air-pump and the pump-driving electric motor in the same unit, practically all operating parts of the mechanism are thus grouped together, apart from the musical instrument, so that neither the appearance nor the tonal qualifications thereof are changed or impaired, and the arrangement of the last-named elements in the unit is such that they, too, may be much more easily and conveniently reached than is customary. The unit containing the controlling mechanism may be, as herein shown, an artistically designed cabinet which may also very conveniently serve as a record-cabinet, and may either form a part of the furnishings of the same room with the musical instrument or be placed in an adjoining room.

Preferably, and for obvious reasons, the pneumatic player-action and the air-pressure-controlling expression device continue, according to this invention, to be located at the musical instrument, but these elements may in themselves be easily concealed without necessitating any special provision therefor, and their bulk, weight, and arrangement with respect to the vibratory parts of the piano are not such that their association therewith will interfere with the tonal qualifications of the instrument. Furthermore, should it be desired to muffle any sounds from the operation of these parts, it would not involve muffling the tonal volume of the instrument, as has been the custom where all of the operating parts are housed by the instrument.

Considering, then, the arrangement of the parts as shown herein, it will be seen that it completely avoids the hereinbefore mentioned detraction from the appearance of the instrument. It also avoids interference with the tonal qualifications of the instrument and that amplification of the sounds emanating from the running machinery which is usually to be found where the air-pump and electric motor are arranged close up to the sounding-board of the piano, and where the record holding and driving mechanism is arranged at or near the forward part thereof, all of such parts being secured, in such instances, to the piano frame, while, in the present arrangement, they need not be near the piano. Any sounds from the running machinery, if discernible under the present arrangement, may here be muffled without muffling the tone of the instrument. The arrangement herein shown very clearly avoids the usual compact and stowed-away positioning of the parts which has heretofore rendered them so difficult to reach and lubricate or adjust, which inconvenient positioning has become a well-known characteristic of the usual automatic musical instrument, especially of the reproducing piano, and which has been necessary in order to conceal the parts as effectively as possible, and it also avoids the necessity of one's approaching the instrument before and after the playing of each selection, to place and remove the different records. The value of these features, together with the facts that all operating parts of the mechanism are here disposed so that they may be conveniently reached, the several records may each be conveniently placed in proper position, identified, and removed or exchanged, and the tempo of each musical selection may be individually determined when the respective record is placed in position, will be apparent to those familiar with the operation and care of instruments of this character.

The grouping and arrangement of the parts are such that the construction herein described and claimed may be manufactured and sold as a product separate from the musical instrument with which it may later be associated, and the fewness of the parts here necessary to be attached directly upon or within the musical instrument provides for a simple installation of a complete automatic player-mechanism without mutilation or disfigurement of such instrument. Furthermore, the construction is such that it may be easily converted and re-converted to properly control the operation of any automatic musical instrument designed to be controlled through the employment of any standard type of record and, when used in connection with one of such instruments which possesses individual characteristics, such as is often the case with reproducing pianos, such characteristics are in no wise changed or disturbed, since the specifications and adjustments of the player-action and the expression device may remain exactly as designed for the particular instrument.

The musical instrument herein shown at 1 (Figure 1) is, as has been stated, a reproducing piano and, as such, may be provided with any suitable type of pneumatically operated player-action 2 and expression device 3. The player-action may comprise the usual striker-pneumatics 4 (Figure 11) for actuating the note-sounding elements 5 of the piano in the usual or any preferred manner, and the actuation of the striker-pneumatics may be individually controlled through any preferred arrangement of action-valves located within the valve-chest 6. For operating the player-action, the air-pressure within valve-chest 6 may be reduced by the withdrawal of air therefrom through the conduit 7, and the degree or extent of such pressure reduction may be controllably varied through the expression device 3 to determine the power with which the striker-pneumatics 4 may actuate the note-sounding elements 5 and thus produce musical expression effects in the playing. Further musical expression effects are obtainable through the pneumatic operation of the usual string-dampers and hammer-rails of the instrument, but the construction and use of these devices are well known and do not form a part of this invention, so that they need not be here illustrated or described, it being sufficient, for the purpose of this description, to explain that the individual actuation of the note-sounding striker-pneumatics 4, the desired variations in the degree of pressure reduction effected through the expression device 3, and the pneumatic operation of the string-dampers and hammer-rails, as well as such operation of any other parts located at the musical instrument, are each and all effected by reduced air-pressure which is caused by the withdrawal of air from the several devices through the conduit 7, and are each and all controlled in operation through individual conduits similar to the conduit 8 (Figure 11).

One or more magnet-rails 9 are arranged upon the instrument, conveniently disposed with respect to the several parts of the player-mechanism with which they are operatively associated, and the conduits 8 are connected therewith, each conduit being connected with a channel which has an upwardly opening port 10 in a valve-strip 11. Each port 10 is controlled by an armature-valve 12, which is actuable by an electro-magnet 13 to open and close the port to atmosphere and thus control the operation of the device connected with the respective conduit 8. Each electro-magnet 13 is connected by a magnet-wire 14 with a circuit making and breaking contact-device located in the controlling mechanism cabinet 15, which contact-device will be described later. The conduit 7, through which air is withdrawn from the pneumatically actuable devices located at the musical instrument, is also connected with devices located in the controlling mechanism cabinet 15, and the conduit preferably constitutes a hollow core, around which the magnet-wires 14 are arranged to form a flexible conduit-cable 714 which may be disposed along the wall of the room, or otherwise desirably and unobtrusively arranged, to extend from the musical instrument 1 to the controlling mechanism cabinet 15.

The controlling mechanism cabinet 15 houses the controlling mechanism 16, the air-pump 17, and the electric motor 18, and may be arranged to provide convenient storage space for a number of records, as shown at 19. The air-pump may be of any preferred construction. It is driven by the electric motor 18, through pulleys 20 and 21 and belt 22, to exhaust air from the chamber 23, with which the conduit 7 is directly connected. The electric motor is controlled from the main line switch 24 (Figs. 7, 8 and 23), the operation of which will be described later. Chamber 23 is provided with an "overblow" or safety-valve 25 (Figure 10) which may be of any preferred construction to yieldingly resist the admission of atmospheric air, the yielding point thereof being adjustable to determine the maximum degree to which the air-pressure shall be reduced by the air-pump. In the construction shown, valve 25 is held closed over the atmospheric inlet-port 26 by a tension-spring 27, one end of which is attached to the valve and the other to one end of a rocker 28, and the tension of said spring may be adjusted by means of the screw 29 which is arranged to act upon the other end of said rocker. Inlet-port 26 and the parts 27 to 29, just described, are covered by the muffler-cap 30, access to screw 29 being obtained through one of the muffler-ports 31, upon lifting the depending end of the muffler-felt 32 therefrom.

Each magnet-wire 14 is connected, through its respective binding-post 33 (Figs. 3 to 6, 12 and 23) and wire 34 (Fig. 12), with a flexible contact-finger 35, which is arranged within the air-tight contact-box 36 to be actuated by a corresponding tracker-controlled pneumatic diaphragm 37. The chamber 38 below each pneumatic diaphragm is connected, by the usual tracker-tube 39, with its respective aperture in the tracker 40 (Figs. 3 and 22), and is provided with the customary "bleed" or pin-hole connection 41 with the air-chamber 42, whereby the operation of each diaphragm 37 may be automatically controlled in the usual manner by the passing of a perforated record across the tracker 40. The inflation of each diaphragm 37 will lift the respective contact-finger 35 into contact with a universal contact-bar 43, which is connected, by a wire 44, binding-post 45, and return-wire 46, with the negative pole of the secondary side of a transformer 47 (Fig. 23). The positive pole of the secondary side of the transformer is connected with a feed-wire common to all of the electro-magnets 13 at the musical instrument, and the primary side of the transformer is connected with the main line circuit (both of which connections will be traced later), so that, when the air-pressure is reduced in the air-chamber 42, the opening of the various tracker-apertures by passing record perforations will effect the pneumatic operation of the respective diaphragms 37, actuate the corresponding contact-fingers 35 to close the circuits, and energize the respective electro-magnets 13, thus effecting the lifting of the respective armature-valves 12 from their ports 10, and in this manner controlling the pneumatic operation of the various devices located at the musical instrument.

Tracker 40 is mounted, adjusted, and arranged to co-operate with the record-holding magazine or carrier 48 in an entirely novel manner. This is a very important feature of the invention, since it permits the standard types of records to be employed and provides for their placement in, and removal from, position upon their supports in the customary manner. To explain, the standard types of records are such that the direction of winding of the records and the position of the reading matter thereupon are unmistakable and well recognized indications of how the record-spools are intended to be positioned upon their supports in the instrument and, with such a record properly positioned, it is customary to draw the record downwardly or forwardly from the record-spool, over the tracker, and attach it to the usual take-up spool. The label, showing the title of the composition, the words (if any), and the various markings appear upon the standard record upon what is thus intended to be its forward or upper surface or obverse side, in proper position to be read when the record-spool is in position upon its supports.

In order to provide for this customary positioning of the records in a magazine or carrier holding a number of such records ready for selective service, and in order to have the diameter of the magazine or carrier (here shown as a rotatable drum) as small as possible, it has been found advisable to arrange the several sets of take-up spools and record-supports in the manner shown and to present and withdraw the tracker to and from contact with what has become established as the reverse side of the several records, and this requires the respective entrance and withdrawal of the tracker into and from the path of the positioning movement of the several record take-up spools and their attached records. There are various reasons for preferring to have the tracker "read" from the aforesaid reverse sides of the several records, one reason being that records are usually perforated and wound so that the reverse sides thereof are the smoother sides, being free from the turned or burred edges of the perforations, and another reason being that the "lay" of the records upon the face of the tracker is better, due to the curve or bend in the records resulting from their being constantly coiled in the same direction.

The record-holding magazine or carrier is here shown in the form of a rotatable drum 48, comprising a pair of disc-like side-plates 49 and 50 which are rotatably mounted upon a horizontal shaft 51. Shaft 51 is rigidly secured in position in or upon cross-bars 52 and 53, which form a part of the framework of the structure, and side-plates 49 and 50 are secured to each other by a plurality of shouldered tie-rods 54, each of which axially supports a take-up spool 55. Eight of such take-up spools are shown, but it will be understood that the number may be varied and the size of the drum may be changed without departing from the scope of this invention. For each take-up spool, there is a companion pair of record-spool supports, each comprising the usual spring-pressed left-hand bearing 56 and the usual clutch-shaft 57 (Fig. 2). Drum 48 is rotated by means of a grooved pulley 58, which is spaced away from but firmly secured to the side-plate 50 by screws 59 and spacer-collars 60. Pulley 58 is driven by a belt 61 from a smaller pulley 62 (Fig. 3) which is fixed upon a counter-shaft 63 (Figs. 3 and 7). Counter-shaft 63 is supported by an U-shaped bearing-member 64 and is driven by a gear 65. Bearing-member 64 swings upon the main driving shaft 66 and gear 65 meshes with a pinion 67 which is also mounted upon the driving shaft 66. A tension-spring 68 is secured at one end to the floor or framework of the structure and attached at the other end to the free or swinging end of the bearing-member 64. Counter-shaft 63 and pulley 62 are thus drawn downwardly by the action of the tension-spring 68 to maintain the proper tension upon the belt 61, without disturbing the proper meshing of gear 65 with pinion 67. Pinion 67 is provided with a sleeve which is free to turn upon driving shaft 66 and constitutes the driven member 69 (Fig. 7) of a clutch. Driven member 69 may be maintained laterally in position upon driving shaft 66 in any preferred manner to keep pinion 67 in mesh with gear 65 and to receive the thrust of the driving member 70 of the clutch. Driving member 70 is keyed upon driving shaft 66 and is provided with an annular groove 71 which receives the pins of a yoke-shaped shifter-arm 72, the shifter-arm being secured upon the movable side of a collapsible pneumatic 73. A tension-spring 74 (Fig. 5) is secured at one end to a fixed post 75 and attached at its other end to the movable side of the pneumatic 73 to yieldingly maintain the pneumatic expanded and the clutch engaged. Driving shaft 66 is driven by the shaft 76 through bevel-gears 77, and shaft 76 is driven from the shaft 78 of air-pump 17 through pulleys 79 and 80 and belt 81 (Figs. 1, 3, and 5 to 7).

Fixed upon main driving shaft 66, one near each end thereof, are two sprockets 82 and 83 (Fig. 7), the first of which is connected by a sprocket-chain 84 with a sprocket 85 of the gearing for driving the several take-up spools 55 to propel the respective records forwardly, and the other of which is connected by a sprocket-chain 86 (Fig. 3) with a sprocket 87 for driving the several record-spool clutch-shafts 57 to re-wind the respective records. Sprocket 85 drives one member of a speed-equalizing slip-clutch or overwinding device 88 (Figs. 2 and 7), the driven member of which acts upon the shaft 89 and turns the same at speeds controllable by any suitable type of variable speed controller, the type shown herein being that usually employed for controlling the speed of talking machine spring-motors, comprising the worm-gear 90 (Fig. 8) which is fixed upon shaft 89, the worm 91 which is driven by worm-gear 90, the butterfly-governor 92 having the friction-disc 93 and driven by worm 91, and the adjustable friction-pad 94 against which friction-disc 93 is drawn by the centrifugal action of the butterfly-governor 92. The operation of these parts will be described later. Shaft 89 also carries a sprocket 95 which is connected by a sprocket-chain 96 with a sprocket 97 (Figs. 2 and 4). Sprocket 97 is carried at one end of a shaft 98 which is arranged above the record-carrying drum 48 and carries another sprocket 99 near its opposite end (Figs. 3, 17 and 18). An arm 100 is journaled upon shaft 98 near sprocket 99 and carries, at its free or swinging end, a short pinion-shaft 101, which is provided with a pinion 102 and a sprocket 103. Sprocket 103 is connected by a sprocket-chain 104 with sprocket 99, and arm 100 is designed to be lowered and raised, in a manner to be later described, to move the pinion 102 into and from engagement with the gears 105 of the several take-up spools 55. Sprocket 87 (Figs. 2, 3 and 5) is carried upon a short shaft 106 which is slidably journaled in a bearing-member 107 supported upon cross-bar 53. An expansion-spring 108 (Figs. 2 and 17) acts upon the shaft 106 to move and yieldingly hold it moved away from the record-carrying drum 48, and a collapsible pneumatic 109 acts (upon the withdrawal of air therefrom) to move said shaft 106 in the opposite direction. Each of the several record-spool clutch-shafts 57 is journaled in a boss formed upon the side-plate 50 and extends through an opening in the grooved pulley 58. The inner or spool-engaging end-part of each clutch-shaft 57 is acted upon by a friction-brake 110, provided for the customary purpose of steadying the unwinding of each record from its record-spool during playing, and the opposite end-part of each clutch-shaft is transfixed by a pin 111 which forms the driven member of a clutch, the driving member thereof being carried upon the side of the sprocket 87 in the shape of a laterally projecting stud or pin 112. Normally, expansion-spring 108 holds shaft 106 moved away from the record-carrying drum 48 and pin 111 will not be engaged by pin 112 but, when a record is to be re-wound, air is withdrawn from pneumatic 109 and its collapse forces shaft 106 toward drum 48, compressing expansion-spring 108 and bringing pin 112 into engagement with pin 111, whereupon the rotation of shaft 106 will effect the rotation of the particular clutch-shaft 57 which is then in alinement therewith and cause the respective record to be re-wound upon its record-spool.

One important feature of this invention is its complete adaptability for use with any type of automatic musical instrument, whether or not a piano and whether or not a "reproducing" instrument, such as is herein shown and described. It is evident that such adaptation may easily be made by simply providing the controlling mechanism with the proper tracker for the chosen type of instrument and then employing records designed for co-operation with such tracker.

Tracker 40 is removably secured in position, by screws such as the screw 113 (Fig. 18), along one side of a swinging, trough-like frame 114, the other side of which frame is fixed upon a shaft 115, which shaft is both rotatably and slidably mounted in bearings 116 and 117 supported upon the upper side cross-members of the frame of the structure. The lengths of tracker 40 and frame 114 are such as to amply allow for lateral adjustment thereof for "tracking" purposes when these parts are lowered into operative position between the side-plates 49 and 50 of the drum 48. When the tracker and frame are swung upwardly into inoperative position (shown in Fig. 3 and in full lines in Fig. 18), the drum 48 may be rotated to bring any one of the several records into operative position, but, when said tracker and frame are swung downwardly into operative position (shown in dotted lines in Fig. 18), the tracker is projected between side-plates 49 and 50 and between the record-spool and the take-up spool of the selected record and, under such circumstances, the drum must be locked against rotation. It will be noted that side-plates 49 and 50 are formed with deep and widely flaring notches 118 between tie-rods 54 and that each of such notches extends, tangentially with respect to the axis of the drum 48, toward a point between a take-up spool and its corresponding record-spool. A stud-roller 119 is carried at one or both ends of the trough-like tracker-frame 114 to co-operate with the notches in either or both side-plates 49 and 50, and the arrangement of the parts is such that, when the drum 48 has been rotated to bring a selected record into approximately correct operative position, the subsequent downward swinging of tracker 40 and frame 114 into operative position will swing the stud-roller 119 (only one is shown in most of the drawings herein) into the widely flaring mouth of the respective notch 118, and such downward swinging of the tracker and frame will continue until the stud-roller has been firmly seated in the bottom of the notch. During such downward swinging, any bearing of the stud-roller 119 upon either of the converging sides of the notch 118 will adjust the drum 48 and, when such downward swinging is stopped by the seating of the stud-roller in the bottom of the notch, the drum will be thereby firmly locked against rotation, the selected record will have been accurately positioned, and tracker 40 will have been projected the proper distance between the respective take-up spool and record-spool into operative contact with the record. This described accurate positioning of the selected record and the locking of the drum against rotation not only insures the proper co-operation between tracker and record, but it also insures the proper meshing of the pinion 102 with the gear 105 of the selected take-up spool and the proper alinement of the selected clutch-shaft 57 with the slidable re-winding shaft 106.

Tracker-shaft 115 is rotated, to effect the described swinging of frame 114 and tracker 40, by means of an arm 120, which is fixed upon tracker-shaft 115 and is connected by a tie-rod 121 with the movable side 122 of power-pneumatic 123 (Figs. 2 and 3). An elastic connection of the tie-rod with the power-pneumatic is provided for the purpose of limiting and regulating the strain upon the connected parts. An upstanding bracket 124 is carried upon movable side 122 and is provided with an horizontally arranged arm 125 which loosely engages tie-rod 121 between two stops 126 and 127 thereon. A washer 128 acts as a cushion between arm 125 and the upper stop 126, and an expansion-spring 129 between arm 125 and the lower stop 127 permits power-pneumatic 123 to continue to collapse after the downward swinging of tracker 40 and frame 114 has been completed. Movable side 122 also carries a horizontally projecting arm 130 which is positioned to contact with and operate the valves of two valve-devices 131 and 132 which are adjustably secured upon an adjacent part of the frame of the structure. The upper valve-device 131 comprises a port-block 133 and a spring-valve 134. When power-pneumatic 123 is fully expanded by the comparatively powerful V-spring 135 (Figs. 2 and 7), arm 130 bears upwardly upon the spring-valve 134 and holds it closed over its port to exclude atmospheric air from the conduit 136 leading to the valve-action 137 (Fig. 22) which controls the connection of the clutch-shifting pneumatic 73 with the air-pump 17. As power-pneumatic 123 begins to collapse, arm 130 is thereby lowered away from valve-device 131, and spring-valve 134, being curved to stand normally open, will admit atmospheric air to conduit 136 and thereby cause valve-action 137 to operate to effect the collapse of pneumatic 73 and the disengagement of the clutch. Thus, the rotation of the drum 48 ceases before tracker 40 and frame 114 are swung downwardly into the path of any of the drum-parts, and, as power-pneumatic 123 continues to collapse, stud-roller 119 is drawn into the proper notch 118 and firmly seated in the bottom thereof, accurately positioning and locking the drum and properly presenting the tracker to the selected record, as hereinbefore described. The last part of the collapsing movement of power-pneumatic 123 is concerned with effecting the pneumatic connection of several valve-actions with the air-pump 17, which valve-actions control the pneumatic operation of parts which should not be operated until after the aforesaid stopping and locking of the drum and the operative association of the tracker and record has been completed. The lower valve-device 132 is located so that its spring-valve 138 may not be reached by arm 130 until after tracker 40 has been properly positioned, but, after this has been effected, further collapse of power-pneumatic 123 compresses expansion-spring 129 (thus continuing to hold tracker 40 firmly positioned) and arm 130 bears downwardly upon spring-valve 138, pressing it away from its port in the port-block 139 and admitting atmospheric air to the conduit 140. Spring-valve 138 is straight and stands normally closed. Conduit 140 extends to a valve-action 141 (Figs. 9 and 22) which controls the pneumatic connection of the air-pump 17 with valve-actions 142, 143 and 144, (Figs. 3, 6, 7 and 22). Valve-action 142 controls the pneumatic connection of contact-box 36; valve-action 143 controls the pneumatic connection of several devices which are concerned with the re-winding of the records and the re-setting of parts to be described later; and valve-action 144 controls the pneumatic connection of devices concerned with the re-playing operation. The operation of power-pneumatic 123 is controlled through a valve-action 145.

All of the valve-actions 137 and 141 to 145, inclusive, may be alike and of the same general construction as valve-action 146 (Fig. 13), comprising the usual air-chamber 147, valve-chamber 148, valve 149, atmospheric valve-port 150, valve-port 151 connecting chambers 147 and 148, valve-operating diaphragm-pneumatic 152, "bleed" or pin-hole connection 153, air-chamber-exhausting conduit 154, conduit 155 extending from the pneumatic to be controlled in operation, and conduit 156 through which the operation of diaphragm-pneumatic 152 is controlled. Admission of atmospheric air through conduit 156 in greater quantities than can be withdrawn through bleed 153 will permit diaphragm-pneumatic 152 to be drawn inwardly by the air-tension created in air-chamber 147 by the withdrawal of air therefrom through conduit 154. This inward movement of diaphragm-pneumatic 152 moves valve 149 from port 151 to close atmospheric port 150, shutting off the admission of atmospheric air from valve-chamber 148 and conduit 155 and causing the air to be withdrawn therefrom (and from the pneumatic connected therewith) through port 151, air-chamber 147, and conduit 154.

Arm 100 (Figs. 3, 17, and 18) is provided with a branch arm 157 which extends over and rests upon an arm or cam 158 fixed upon shaft 115. This part of the construction is such that, as shaft 115 is turned by arm 120 to swing tracker 40 and frame 114 downwardly into operative position, cam 158 will also be turned to lower branch arm 157 and arm 100 until pinion 102 meshes with gear 105 of the selected take-up spool 55. When tracker 40 and frame 114 are returned upwardly into inoperative position, cam 158 will contact with and lift branch arm 157 until, when stud-roller 119 comes to rest against stop 159 (Figs. 17 and 18), arm 100 and pinion 102 will be clear of all parts of drum 48.

While pinion 102 is thus moved upwardly and held in inoperative position by the same means which moves tracker 40 and frame 114 upwardly and holds them in inoperative position, it is to be particularly observed that, when pinion 102 is lowered into operative position in the manner just described, it is not held in such lowered position, as is the tracker 40 and the frame 114, but is free to be lifted out of mesh with gear 105 while the tracker and frame remain in their lowered positions. It has already been pointed out that the accurate positioning and locking of drum 48 by the entrance and seating of stud-roller 119 in a selected notch 118 serves to properly aline the respective clutch-shaft 57 with the slidable re-winding shaft 106. It is very evident, then, that the drum must be kept locked against movement while the record is being re-wound, and it is also evident that it should be so locked until the re-winding is completed for the additional reason that it might be that the same selection should be immediately repeated or re-played. Arm 100 is provided with an eye 160 which serves as a guide for the upper end-part of an obliquely extending rod 161. Rod 161 is pivotally secured at its lower end upon the movable side of the re-wind pneumatic 109 and is provided near its upper end with a set-collar 162. Upon the collapse of pneumatic 109 to move shaft 106 toward drum 48 and engage the two clutch-pins 111 and 112, the lateral movement of the lower end of rod 161 by the movable side of pneumatic 109 will cause the upper end-part of the rod to slide in eye 160 until collar 162 abuts thereagainst and lifts arm 100. Collar 162 is so positioned upon rod 161 that it effects the lifting of arm 100 sufficiently to safely disengage pinion 102 from the gear 105 of the selected take-up spool 55 before the two clutch-pins 111 and 112 engage and begin to re-wind the record, thus insuring against a possible locking of the record-propelling gearing and against damage thereto or to the record.

As hereinbefore mentioned, shaft 115 is slidably, as well as rotatably, mounted in bearings 116 and 117, and the lengths of tracker 40 and frame 114 are such as to amply allow for lateral adjustment thereof for "tracking" purposes when these parts are lowered into operative position between the side-plates 49 and 50 of the drum 48. This lateral adjustment of shaft, frame, and tracker is effected through the record-controlled operation of two opposed shifter-pneumatics 163 and 164, the movable members of which are provided with abutments 165 and 166 which, upon the deflation of said shifter-pneumatics, bear outwardly against the forward end-parts of two levers 167 and 168, respectively. Levers 167 and 168 are pivoted between their ends upon the upper side cross-members of the frame of the structure and their rearward end-parts bear against the opposite ends of shaft 115. Air is withdrawn from shifter-pneumatics 163 and 164 through conduits 169 and 170, respectively (Fig. 22), which open, through respective "bleeds" or pin-hole connections (not shown), into a common chamber 171. Air is withdrawn from chamber 171 through conduit 172, which is connected with chamber 23, and conduits 169 and 170 are provided with branches which extend to tracker-apertures 173 and 174, respectively, which are positioned to be covered, or partially covered, by the marginal part of the record. The operation of this part of the device is as follows: Both shifter-pneumatics 163 and 164 are exhausted through their respective conduits 169 and 170 and "bleeds" from chamber 171, and their respective levers 167 and 168 are thus brought to bear in opposite directions against the ends of shaft 115. So long as tracker-apertures 173 and 174 are covered by the margins of the record, or are each uncovered an equal amount, there will be no adjustment of shaft 115, frame 114, and tracker 40, since the shifter-pneumatics 163 and 164 are of the same size and the air-pressure is reduced an equal amount in each one thereof, but, whenever a relative lateral movement between the record and the tracker occurs and either of the tracker-apertures 173 and 174 is uncovered a greater amount than the other, the amount of air thus admitted to one of the conduits 169 and 170 is greater than that admitted to the other thereof and the collapsing power of the respective shifter-pneumatic is weakened so that it cannot resist the opposing action of the other shifter-pneumatic, resulting in a slight movement of the shaft 115, frame 114, and tracker 40, sufficient to restore the tracker-aperture to its covered position beneath the margin of the record, or to a position in which it is covered to the same degree as its mate at the opposite edge of the record. Preferably, this tracking operation is effective during both the forward movement of the record and the re-winding thereof, since many of the standard types of records are provided with "re-play" perforations at their forward end-parts and it is important that such perforations should "track" perfectly over the proper tracker-aperture (when such tracker-aperture is employed instead of the re-play valve hereinafter described), especially in instances where the re-winding is accomplished at comparatively high speed and the re-play perforation is comparatively short.

Referring, now, to Figures 1, 8 and 14, it will be observed that there are eight manually operable tempo-adjusting indexes 175 with complemental graduated tempo-scales 176 circularly arranged and consecutively numbered upon the dial-plate 177. Dial-plate 177 is rigidly connected by eight posts 178 with a plate 179 and thus constitutes the forwardly presented side of a cage 180 which is mounted upon and rotatable by a short shaft 181, which shaft is supported in a bearing 182 (Fig. 2) and is connected for rotation of the cage in synchronism with the record-carrying drum 48, by means of bevel-gears 183 (Figs. 2 and 5), sprocket 184, sprocket-chain 185, and sprocket 186, the last-named sprocket forming part of a barrel 187 which is secured to a hub 188 upon the side-plate 49. Each index 175 is fixed upon a threaded stem 189 which is journaled for rotation in the dial-plate 177 and plate 179 and carries a threaded disc 190, which disc slidably engages one of the posts 178 to prevent the disc from being rotated with stem 189 when the respective index 175 is operated, this part of the construction being such that operation of each index 175 will move the respective disc 190 into different vertical planes between the dial-plate 177 and plate 179. A brake-lever 191 is arranged to extend vertically for co-operation, at its upper end, with the disc 190 of the lowermost index 175 and, at its lower end, with the friction-disc 93 of the variable speed controller. Brake-lever 191 is pivoted between its ends, at 192, upon a pivot-post 193, which is rigidly secured upon the adjacent corner-upright of the frame of the structure, and the upper end of the brake-lever is provided with a transversely extending cam-plate 194 for contact with the discs 190, while the lower end-part thereof carries the friction-pad 94 for contact with the friction-disc 93. Numbers are arranged upon the periphery of side-plate 50, near each take-up spool 55, to correspond with the numbers carried by the dial-plate 177, for the purpose of identifying each record carried by the drum 48 with its respective tempo-adjusting index 175.

The arrangement just described provides for the individual adjustment of the tempo of each musical composition. Upon placing the different record-spools in position upon their supports 56 and 57 and drawing forward and attaching the forward ends of the records to the respective take-up spools in the usual manner, the tempo figure usually appearing upon each record may be observed and, likewise, the number appearing upon the side-plate 50 near each take-up spool 55, then, turning to the dial-plate 177 and observing the corresponding numbers of the several indexes 175, the desired tempo for each musical composition may be set by adjusting the respective index in accordance with the aforesaid tempo-figure appearing upon the respective records. Of course, the tempo-figures may be disregarded and the indexes may be operated at any time to adjust the tempo of any of the compositions, as desired.

As each record is brought into operative position with respect to the tracker 40, by the hereinbefore described rotation of drum 48, the disc 190 of the respective tempo-adjusting index 175 is simultaneously brought into operative contact with the cam-plate 194 of brake-lever 191, by the synchronous rotation of cage 180, the bevelled or cam-shaped end-parts of the cam-plate riding upon and off from the differently positioned discs as the cage is rotated. The action of the friction-pad 94 upon friction-disc 93 in controlling the speed of the butterfly-governor 92 is too well known to need detailed description here, it being sufficient to explain that the position in which each of the discs 190 has been set, by the adjustment of the respective indexes 175, determines the position of brake-lever 191 and the position which friction-pad 94 will occupy when the cam-plate 194 is in contact with any one of the discs 190, and the speed with which the then connected take-up spool 55 will be driven by the variable speed controller to fix the tempo of the respective musical selection will be determined by the position of the friction-pad 94 and its well known braking and regulating action upon the friction-disc 93 and butterfly-governor 92.

The construction and operation of the speed-equalizing slip-clutch or overwinding device 88 is set forth in U. S. Patent No. 1,387,704, dated August 16th, 1921, and, since it does not form a part of this invention, need not be described in detail, it being sufficient for the purpose of this description to explain that the driving member of this clutch may be rotated at a constant speed, through its hereinbefore described connection with the main driving shaft 66, while the speed at which the driven member of the clutch may be turned thereby to effect the desired tempo of a musical selection is determined by the controlling action of the butterfly-governor 92.

Coming, now, to a description of the selecting mechanism, it may be first explained that this part of the construction comprises manually controllable devices for (a) registering the selection of one or more of the plurality of records which it may be desired to have brought into operation to control the playing of the musical instrument and (b) at the same time closing the main line switch to start the operation of the entire mechanism and inaugurate the movement of the record-carrying magazine to move the selected records into operative position, and for (c) cancelling such registered selections. In addition, the selecting mechanism comprises automatically operable devices for (d) "finding" the selections which have been registered by the manually controllable devices, (e) stopping the movement of the record-carrying magazine when the records representing the registered selections thus found have been brought into operative position, and (f) restoring the manually controllable selection-registering devices to inoperative position, one at a time, after the record representing each registered selection has been brought into operative position and, preferably, when it is about to be re-wound.

Considering these several operations in the order mentioned, it is to be noted that the manually controllable selection-registering and switch-closing devices comprise a series of eight electro-magnets 195 (Figs. 4, 7, 8 and 23), one for each record which may be carried by the record-carrying magazine (the drum 48), and one or more series of eight circuit-closing push-buttons 196 (Figs. 1, 19 to 21, and 23), for separately and selectively controlling the energization of the several electro-magnets. The manually controllable canceling devices comprise an additional electro-magnet 261 which, together with a companion electro-magnet 262 (Figs. 4, 5, 22 and 23), is controlled by another circuit-closing push-button 263. Two sets of these series of push-buttons are shown, one set being located within the controlling mechanism cabinet 15 and the other set being located at a distance therefrom, in a portable controller-indicator 338 to be later described. Obviously, additional sets of push-buttons may be provided and located as desired. The several electro-magnets 195 are horizontally disposed in a horizontal row, one end of each being firmly secured to an upstanding metal plate 197, common to all of said electro-magnets and serving as an electrical "ground" for the several circuits, the plate 197 being connected with the metal base-plate 198 which is, in turn, electrically connected (not shown) with the negative pole of the secondary side of the transformer 47. The electro-magnets 261 and 262 are located separately from the series of electro-magnets 195, and the description of their operation and the use of the push-button 263 will be taken up later on.

The automatically operable devices for finding a registered selection, stopping the movement of the record-carrying magazine, and restoring the manually controllable selection-registering devices comprise a movable finder or selector and a movable abutment-member, both of which are movable in synchronism with the record-carrying magazine. The finder or selector is here shown as a rotatable D-valve 199 and the abutment-member is here represented by the rotatable pin-cylinder 200, both the D-valve and the pin-cylinder being connected for combined rotation by a shaft 201, which shaft is supported in the side-plates 202 and 203 and is geared with drum 48 by means of sprocket 204, sprocket-chain 205, and sprocket 206, for synchronous rotation of the D-valve and pin-cylinder with the drum, the last-named sprocket forming a part of the barrel 187, hereinbefore described as being secured to and rotated by said drum. It is to be noted that sprocket-chain 205 is crossed and that, consequently, the direction of rotation of pin-cylinder 200 is reverse to that of drum 48 (see Fig. 4).

Pin-cylinder 200 is provided with eight radially projecting abutments, here shown as screw-pins 207 (Fig. 8), one for each record which may be carried by the record-carrying magazine (the drum 48), which screw-pins are equally spaced circumferentially upon the pin-cylinder and disposed therealong for individual co-operation with a corresponding number of floating pawls or dogs 208. Dogs 208 are arranged in a row, parallel with the pin-cylinder 200, and each dog is individually slidable in the separate slots of a pair of slotted guide-plates 209. One end of a tie-rod 210 is pivotally connected, at 211, to each dog between its ends, this end of the tie-rod resting upon the lower guide-plate 209 and thereby preventing the dog 208 from dropping down out of position, and the other end of the tie-rod is pivotally connected with the upstanding arm 212 of a pivoted latch 213. The lower end of each dog is acted upon by a tension-spring 214 and is drawn thereby toward its respective latch 213, and the upper end-part of each dog has an undercut bevelled edge, at 215, presented for contact with its respective screw-pin 207.

Latches 213 are arranged in a row, pivotally supported upon a horizontal shaft 216, which shaft is rotatably mounted in the side-plates 202 and 203, and each latch is formed with three arms which extend radially from the shaft in different directions. The upstanding arm 212 is connected, as aforesaid, by the tie-rod 210 with its respective dog 208, and the rearwardly facing edge of this arm is cam-shaped for a purpose to be presently described. The second or latching arm 217 extends rearwardly, at an approximate right-angle to the upstanding arm 212, for latching engagement with an upstanding trigger 218, and the third arm 219 projects downwardly and is acted upon by a tension-spring 220, which tends to throw the latch and bring arm 217 thereof down upon a stop-bar 221 when said arm is released from latched engagement with trigger 218.

Triggers 218 are also arranged in a row, notched at their upper ends, at 222, for engagement with the ends of latching arms 217 of their respective latches 213, pivoted at their lower end-parts upon a horizontal shaft 223 and spaced therealong in conformity with the spacing of latches 213 upon shaft 216, and individually located in proper position, with respect to the eight electro-magnets 195, to be separately and selectively operated by said electro-magnets.

Each electro-magnet 195 is constructed with a hollow core, one end-part thereof being threaded to receive the screw 224 which firmly secures the electro-magnet in position upon the plate 197, and the other end-part thereof housing the shank of a headed plunger-armature 225 and an expansion-spring 226. Expansion-spring 226 acts upon the head of plunger-armature 225 to move the same outwardly from the core into contact with the adjacent respective trigger 218, causing the plunger-armature to bear with latching effect against the trigger. This contact of plunger-armature 225 with trigger 218 lends additional magnetic properties to the trigger and, upon the energization of any one of the eight electro-magnets 195, the respective plunger-armature 225 will magnetically adhere to the corresponding trigger 218 and assist in withdrawing it from engagement with its latch 213.

Upon the selective manual operation of one or more of the push-buttons 196, the respective electric circuit or circuits will be closed and the corresponding electro-magnet or electro-magnets 195 will be energized. The energization of each electro-magnet will effect the release of the respective latch 213 in the manner just described, and the latch will be thrown by its tension-spring 220, latching arm 217 coming to rest upon stop-bar 221 and upstanding arm 212 acting, through tie-rod 210, to draw the respective dog 208 rearwardly so that the upper end-part thereof is moved into the path of movement of the corresponding abutment or screw-pin 207. This dog-actuating movement of the upstanding arm 212 presses the aforesaid cam-shaped rearward edge thereof against the downwardly projecting free end-part of one of eight spring-pressed valves 227, moving it against the valve-closing influence of its spring 228 to uncover an atmospheric inlet-port 229 and pressing it against a transversely arranged universal bar 230. Bar 230 is bent upwardly at each end-part thereof to form a pair of swinging supporting arms, such as arm 231, which arms are pivotally supported at their upper ends in or upon side-plates 202 and 203. Bar 230, in turn, transmits the throwing movement of each of the several latches 213 to the lower end of a lever 232, which is pivoted between its ends, at 233, upon a horizontal shaft 234 and is connected, at its upper end, with one end of a tie-rod 235, which tie-rod extends forwardly to, and is connected with, the upper end of a latch-lever 236. Latch-lever 236 is pivoted between its ends, at 237, upon a horizontally disposed, vertically swinging lever 238, and the lower end of the latch-lever is notched, at 239, to engage with a lug 240 upon the forward end of the main line switch-arm 241. An upright bracket or post 242 is fixed upon the base-plate 198 and provides three pivotal points 243, 244 and 245, respectively, for the lever 238, switch-arm 241, and a vertically swinging arm 246, the last-named arm being secured upon one end-part of a shaft 247 and having its swinging end connected with the swinging end of lever 238 by a link 248. It will be noted that link 248 extends below its pivotal connection with arm 246 and rests upon a cushion on the base-plate 198, thereby limiting the downward swinging movement of arm 246, lever 238, and latch-lever 236. Latch-lever 236 is acted upon by a spring 248a, lever 238 is drawn downwardly by the action of a tension-spring 249, and switch-arm 241 is acted upon by a tension-spring 250, the relative strength and arrangement of the two tension-springs being such that, when the lug 240 is engaged by notch 239, switch-arm 241 will be held, by the stronger influence of tension-spring 249, against the influence of tension-spring 250, away from the switch-points 251 and 252 and the main line switch (indicated in general by the numeral 24) will be open, while, upon vibration of the latch-lever 236 to disengage the notch 239 thereof from lug 240, tension-spring 250 will draw switch-arm 241 into switch-closing position.

Shaft 247 extends through a bearing in the side-plate 202 and is provided, at its outer end-part, with a vertically disposed rock-arm 253, the swinging end of which rock-arm is connected by a tie-rod 254 with the movable wing of a retriever-pneumatic 255, the arrangement being such that collapse of retriever-pneumatic 255 will rock the shaft 247, swing arm 246 and thereby raise link 248, lever 238, and latch-lever 236, against the downwardly acting influence of tension-spring 249, and permit notch 239 to re-engage with lug 240. If, at such time, none of the latches 213 are in released position, notch 239 will re-engage lug 240 and, upon the expansion of retriever-pneumatic 255, tension-spring 249 will return lever 238 and latch-lever 236 to their lowered positions until stopped by the contact of the lower end of link 248 with base-plate 198, and thereby effect the opening of the switch 24. However, if any one of the latches 213 are in released position, universal bar 230 will continue to be held thereby and will, in turn, continue to hold latch-lever 236, through the connections hereinbefore described, so that it cannot be swung back by its spring 248a to allow notch 239 to engage lug 240, the expansion of retriever-pneumatic 255 and the downward movement of the parts 246, 248, 238, and 236, by tension-spring 249, will not act upon switch-arm 241, the switch 24 will remain closed and the instrument will continue in operation until all of the latches 213 are restored to latched position, whereupon the next operation of the retriever-pneumatic 255 will effect the engagement of notch 239 with lug 240, and the subsequent expansion of the retriever-pneumatic will permit the tension-spring 249 to lower the parts aforesaid, overcome the resistance of tension-spring 250, and raise switch-arm 241 from switch-points 251 and 252, thereby opening the main line switch 24 and stopping the operation of the entire mechanism.

Shaft 216 also extends through a bearing in the side-plate 202 and is likewise provided, at its outer end-part, with a rock-arm 256, this rock-arm being horizontally disposed and the swinging end thereof being connected by a tie-rod 257 with the movable wing of a cancelling-pneumatic 258. A universal bar 259 is arranged to extend along beneath all of the latching arms 217 of the eight latches 213, and said bar is rigidly secured by a plurality of arms, such as the arm 260 (Fig. 8), to shaft 216, whereby the collapse of cancelling-pneumatic 258 will rock the shaft 216, swing bar 259 upwardly beneath the several latching arms 217, to carry with it all such arms as are at the time in released and depressed position and permit the respective triggers 218 to re-engage therewith, thereby cancelling all such selections as have been previously registered. Of course, as stated in connection with latch-lever 236, if any of the triggers 218 are held by their respective electro-magnets 195 from re-engaging with their corresponding latching arms 217, such latching arms will be free to be again depressed by the respective tension-springs 220, upon the expansion of cancelling-pneumatic 258 and the consequent lowering of bar 259, and the instrument will continue in operation, as aforesaid, until all of the latches 213 are restored to latched position.

Guide-plates 209, stop-bar 221, and shafts 223 and 234 extend across between and are supported by side-plates 202 and 203.

Extending across and to the rear of the lower end-parts of dogs 208, is a universal bar 264, the end-parts of which are bent downwardly to form a pair of swinging arms, such as arm 265 (Fig. 8), which arms are pivotally supported at their lower ends in or upon side-plates 202 and 203. One end-part of this bar 264 extends through side-plate 202, at its pivotal point therein, and is bent upwardly to form a rock-arm 266, and this rock-arm is connected by a tie-rod 267 with the movable wing of a restoring-pneumatic 268. This part of the construction is such that the collapse of restoring-pneumatic 268 will swing the rock-arm 266 and the swinging arms 265, upon their pivotal connections in or upon side-plates 202 and 203, and press bar 264 forwardly against the lower end-parts of all of the eight dogs 208 and move such lower end-parts forwardly against the influence of their respective tension-springs 214. Upon the stopping of drum 48, effected through the D-valve 199 in a manner to be presently described, the selected record will have been brought into operative position with respect to the tracker 40, and the pin-cylinder 200 will have been rotated, through its hereinbefore described gearing with said drum, to bring the screw-pin 207 corresponding to said selected record into contact with its respective dog 208, the head of the screw-pin riding along upwardly upon the undercut bevelled edge 215 of the dog as the respective record is nearing operative position, pushing the upper end-part of said dog forwardly and stopping with the upper end-point of said dog resting pivotally upon the said head of said screw-pin. The collapsing action of restoring-pneumatic 268, in pressing the lower end-part of this particular dog 208 forwardly, will effect the restoring of the respective latch 213 to latched position, the upper end-point of the dog acting as a fulcrum against the head of the contracting screw-pin 207 and the tie-rod 210 and the upstanding arm 212 being consequently drawn forwardly by such action. The upper end-points of the seven other dogs 208 (whether or not positioned in the paths of movement of their several abutments or screw-pins 207), not having their corresponding abutments or screw-pins 207 in position to serve as fulcrums, will be swung rearwardly, turning freely upon their respective pivotal connections 211 with their tie-rods 210, and any of the latches 213 which may have been released to register other selections to be played will not be disturbed by the operation of restoring-pneumatic 268. Here again, it is to be noted that, if the corresponding trigger 218 (for the latch 213 which is connected with the dog 208 fulcruming upon its respective screw-pin 207) is operated and held by its electro-magnet 195 during the expansion of restoring-pneumatic 268, the latch therefor will be allowed to return to its released or depressed position, upon such expansion, and the instrument will continue in operation to re-play the selection. In this respect, this construction differs from that set forth in the hereinbefore mentioned co-pending application, Serial No. 668,266, wherein it is explained that the construction therein described requires the complete rotation of the record-carrying magazine and of the abutment-member, in order to bring about the re-playing of any selection, and that, if any other selections have been registered, they must be played before any preceding selection can be re-played. In the present construction, the re-playing of any selection is not so delayed, although a certain delay in re-playing is obviously necessary in order to permit the re-winding of the record, but a retarding device is provided and will be later described for delaying the effectiveness of the cancelling and re-roll controlling push-button 263, and of the re-roll tracker-aperture, under certain conditions.

The D-valve 199 co-operates with and rotates upon a concentrically arranged seat 269, which is secured by a hub-portion 270 thereof to a bar 271, the end-parts of which bar are removably secured to support-blocks 272 and 273. Support-blocks 272 and 273 are firmly secured to side-plate 202 and serve as supports, respectively, for restoring-pneumatic 268 and retriever-pneumatic 255. The face of seat 269 is provided with a centrally arranged circular groove or open channel 274 and with eight separate concentrically arranged ports 275, equally spaced from and around channel 274. A single tube 276 connects with channel 274, and separate tubes 277 connect with each of the ports 275. The face of D-valve 199 is provided with a short radially arranged groove or channel 278, the inner end of which communicates with channel 274 and the outer end of which moves into communication with each of the ports 275 as the D-valve is rotated. Each tube 277 is connected by a separate conduit 279 with one of the atmospheric inlet-ports 229 located in the port-block 280 (Figs. 8 and 22). Port-block 280 is supported between and upon side-plates 202 and 203 (Figs. 7 and 8) and carries the downwardly projecting spring-pressed valves 227, hereinbefore mentioned, which separately control inlet-ports 229. Tube 276 is connected by a conduit 281 with the valve-action 145 (Fig. 22).

Electro-magnets 261 and 262 are constructed and operate similarly to electro-magnets 13, acting, upon energization, to lift their respective armature-valves and uncover separate atmospheric inlet-ports which communicate, respectively, with cancelling conduit 282 and re-roll conduit 283. The magnet-wires for the two electro-magnets 261 and 262 are connected in circuit with the single push-button 263 and the "ground" for the two electro-magnets is connected with a single switch 284 to be presently described. Re-roll conduit 283 communicates with the upper port 285 in a port-block 286, and is connected by a branch conduit 287 with the re-roll tracker-aperture 288 (Fig. 22). Cancelling conduit 282 extends to the valve-action 289 for controlling the operation of cancelling-pneumatic 258. Valve-action 289 is constructed and operates similarly to valve-action 146.

A second port 290 is located in port-block 286 just below port 285, and the connection of these ports with each other is controlled by a swinging D-valve 291, which is pivoted, at 292, upon port-block 286 and provided, upon its contacting face, with a short groove or channel 293 (Fig. 4). D-valve 291 is provided with a horizontally disposed arm or lug 294, and with a tension-spring 295 which acts downwardly upon the lug to yieldingly hold the D-valve in port-disconnecting position. A slow-acting pneumatic 296, hereinafter termed the re-roll cut-off pneumatic, is positioned below D-valve 291, and the movable lower leaf of this pneumatic is acted upon by an expansion-spring 296a and provided with an upwardly extending arm 297 which is so positioned, with respect to the D-valve, that collapse of the pneumatic will move arm 297 into engagement with lug 294, swing D-valve 291 against the resistance of tension-spring 295, and bring channel 293 into position to communicate with and connect ports 285 and 290. Switch 284, for controlling the "ground" for electro-magnets 261 and 262, is positioned so that it projects into the path of movement of lug 294 and will be closed through the same movement of D-valve 291 which effects the just described connection of ports 285 and 290. Re-roll cut-off pneumatic 296 is connected with, and controlled in operation by, valve-action 145, through a restricted conduit 298 (Fig. 22), which valve-action also controls the operation of power-pneumatic 123 and retriever-pneumatic 255.

Before proceeding with the description of other parts, it may be well to describe the train of operations which are concerned with the delayed action of re-roll cut-off pneumatic 296. While all of the four valve-actions 137, 145, 143 and 144 are shown as positioned upon a single air-chest 299, it is important to note that this air-chest is partitioned, at 300 (Fig. 22), into two distinctly separate sections 301 and 302, valve-actions 137 and 145 being supplied with operating air-tension from the section 301, and valve-actions 143 and 144 being supplied with operating air-tension from the section 302. Section 301 is connected directly with chamber 23, by conduit 303, and valve-actions 137 and 145 are consequently supplied with operating air-tension immediately upon the operation of air-pump 17. The connection of section 302 with chamber 23 is controlled by valve-action 141, with which it is connected through conduit 304, so that valve-actions 143 and 144 are not supplied with operating air-tension until power-pneumatic 123 has reached the latter part of its collapsing movement and effected the actuation of valve-action 141 through the operation of spring-valve 138, as hereinbefore described.

Upon the manual operation of one or more of the push-buttons 196, the corresponding electro-magnets 195 will be energized; latches 213 thrown; dogs 208 positioned; and ports 229 opened. At the same time, the main line switch 24 will be closed and the record-carrying drum 48 will begin to rotate, turning with it the cage 180 carrying the several tempo-adjusting indexes 175, the rotatable pin-cylinder 200, and the D-valve 199; all of which operations have been already described. Upon the registration of channel 278 in D-valve 199 with the first encountered one of the ports 275 connected with one of the open ports 229, atmospheric air will be admitted to the circular channel 274 and thence, through conduit 281, to valve-action 145. The resultant actuation of valve-action 145 will connect section 301, conduit 303, and chamber 23 with (and thus cause the withdrawal of air from) power-pneumatic 123, retriever-pneumatic 255, and re-roll cut-off pneumatic 296, through conduits 305, 306, and 298, respectively (Fig. 22).

As power-pneumatic 123 begins to collapse, spring-valve 134 is thereby allowed to open and admit atmospheric air, through conduit 136, to valve-action 137, which connects section 301, conduit 303, and chamber 23 with pneumatic 73, through conduit 308, causing pneumatic 73 to collapse and disconnect the clutch-members 69 and 70 and stop the movement of the record-carrying drum 48. The continued collapsing movement of power-pneumatic 123 effects the swinging of tracker 40 into operative contact with the record which has been brought into position, thereby swinging the stud-roller 119 into engagement with the bottom of the respective notch 118 to accurately position and lock the drum 48 and meshing the driving pinion 102 with the respective take-up spool gear 105. The record thus selected is now propelled forwardly at the desired speed across the tracker 40, the driving pinion 102 being rotated through its described connections with the air-pump-shaft 78 and controlled in speed by the tempo-adjusting index 175 for the selected record, in the manner already explained. The last part of the collapsing movement of power-pneumatic 123 effects the depression of spring-valve 138 and the consequent admission of atmospheric air, through conduit 140, to valve-action 141, which connects conduit 307 and chamber 23 with valve-actions 142, 143 and 144, through conduits 309 and 304, and section 302 of air-chest 299, respectively, thus providing these valve-actions with operating air-tension ready for their operation, which is controlled in a manner to be presently described.

The withdrawal of air from retriever-pneumatic 255 effects its immediate collapse and, as previously explained, if only one push-button has been operated to register but one selection to be played, the collapse of this pneumatic will effect the engagement of latch-lever 236 with lug 240, and the opening of the main line switch 24 will be effected when the retriever-pneumatic is subsequently allowed to expand. Such expansion and opening of the switch, causing as it does the stopping of the entire mechanism, does not occur, of course, at this time, the retriever-pneumatic being held collapsed during the playing of the instrument and the re-winding of the last of the selected records.

During the collapse of power-pneumatic 123, the re-roll cut-off pneumatic 296 is being slowly collapsed by the withdrawal of air therefrom through the restricted conduit 298, and until its collapse has progressed sufficiently to shift the D-valve 291 to connect ports 285 and 290 and close switch 284, the re-roll tracker-aperture 288 and the push-button 263 will not be effective to cause the re-winding of the selected record. Furthermore, although valve-action 289 for cancelling-pneumatic 258 is supplied with operating air-tension, through conduit 310, immediately upon the operation of air-pump 17, the push-button 263 will not be effective to cancel previously registered selections until switch 284 is closed. It has already been mentioned, in describing the several operations effected in their proper successive order under the control of power-pneumatic 123, that the last part of the collapsing movement of such power-pneumatic is concerned with effecting the pneumatic connection of several valve-actions with the air-pump 17, which valve-actions should not be operated until after the stopping and locking of the drum 48 and the operative association of the tracker 40 and the selected record has been completed, and it may now be further explained that the principal purpose in delaying the connection of ports 285 and 290 and the closing of switch 284 is to prevent the re-roll tracker-aperture 288 and the push-button 263 from becoming effective until the said re-roll tracker-aperture shall have been sealed by the proper contact of the record with the tracker and until a sufficient amount of the forward end-part of the record shall have been wound upon its respective take-up spool 55 to cover an open slot 311 therein which is concerned with the actuation of a re-play valve 312 carried by the tracker-frame 114. If the re-rolling operation were to begin while this re-play valve was effective, the opposing re-rolling and re-playing operations would interfere, and the record might be damaged or withdrawn completely from its hooked connection with the take-up spool. As soon as the record has covered the slot 311 and effected the closing of the re-play valve 312, and as soon as the devices controlled by said valve have had time to operate, the operation of the re-roll mechanism may be effected, and it is for this purpose that the speed of collapse of re-roll cut-off pneumatic 296 is comparatively slow and may be adjusted, as by setting the adjustable stricture 313 in the conduit 298, separately and distinctly from the operation of the power-pneumatic 123.

Passing, for the moment, a description of the slot 311 and re-play valve 312 and assuming that valve-action 142 has been operated and is in position to connect contact-box 36 with air-pump 17, through conduits 314 and 309, the continued advance of the selected record across tracker 40 will control the playing of the respective musical selection upon the musical instrument, in the manner hereinbefore described.

Unless interrupted by the operation of push-button 263, the entire selection will be played, after which the usual record re-roll perforation will register with and uncover re-roll tracker-aperture 288, admitting atmospheric air through conduits 287 and 283, and through the connected ports 285 and 290, to conduit 315 and thence to valve-action 143. The resultant operation of valve-action 143 will effect the connection of re-roll pneumatic 109 and restoring-pneumatic 268 with air-pump 17, through conduits 316 and 317, and 318, respectively, causing such pneumatics to be immediately collapsed. The collapse of re-roll pneumatic 109 will effect the engagement of the re-winding clutch-pins 111 and 112 and, through rod 161, the disengagement of driving pinion 102 from the respective take-up spool gear 105, in the manner hereinbefore described, and the re-winding of the record will begin. The collapse of restoring-pneumatic 268 will effect the restoration of the respective latch 213 (for the record which is being re-wound) to latched position, in the manner already described. It will be understood that, since restoring-pneumatic 268 remains collapsed during the entire re-winding operation, the aforesaid respective latch 213 will continue to be held thereby, and any attempt to re-select the same record for immediate re-playing thereof would be ineffective during such re-winding operation. Furthermore, at the end of each re-winding operation, or, to be more exact, when the re-winding of the respective record has progressed sufficiently to draw its forward end-part from over slot 311, the re-play valve 312 will operate, in a manner to be presently described, to control the mechanism so that it will immediately proceed to move the next of the selected records into operative position, if any other selections shall have been previously registered, and, unless the respective push-button 196 be operated (for the purpose of causing the same selection to be immediately re-played) at the opportune moment, between the expansion of restoring-pneumatic 268 and the expansion of pneumatic 73 (which engages the clutch-members 69 and 70 for rotating drum 48), the playing of the next selection will proceed.

If, however, push-button 263 be operated at any time after the collapse of re-roll cut-off pneumatic 296 has effected the closing of switch 284, such operation will cause electro-magnets 261 and 262 to be energized and atmospheric air to be admitted, as previously described, to cancelling-conduit 282 and re-roll conduit 283. This admission of atmospheric air to re-roll conduit 283 will have the same effect as that just described in connection with the opening of re-roll tracker-aperture 288 by the record re-roll perforation, differing therefrom only in the fact that the playing operation will be immediately interrupted and the record re-wound. The simultaneous admission of atmospheric air to cancelling-conduit 282 will cause the operation of valve-action 289, and thereby effect the immediate collapse of cancelling-pneumatic 258 by connecting it with air-pump 17, through conduit 310. The collapse of cancelling-pneumatic 258 will restore all of the latches 213 to latched position, independently of the action of restoring-pneumatic 268 (which, it will be recollected, collapses simultaneously with the collapse of re-roll pneumatic 109), thereby closing all of the selecting valves 227; and, upon the completion of the re-winding operation and the expansion of retriever-pneumatic 255, the main line switch will be opened and the operation of the mechanism will cease. This expansion of the retriever-pneumatic and the opening of the main line switch will not occur, however, until after re-play valve 312 has performed its function of preparing the mechanism for the next playing operation. The devices concerned with bringing this about will next be described. It may be noted, here, that the operation of push-button 263, in effecting the immediate cancellation of all previously registered selections, permits the re-selection and re-playing of a record whenever desired.

Slot 311 and re-lay valve 312 co-operate in a manner well known in this art, excepting that the single valve herein shown is arranged to be moved into and from co-operative relationship with the individual slots of the several take-up spools 55. A slot 311 is cut in the hollow barrel of each of the take-up spools 55, transversely to the axis thereof (Figs. 17 and 18), serving as a semi-annular groove therein and positioned to be covered by the respective record as it is wound upon the spool. Aligned with said slot is a finger 319, pivotally supported upon the swinging tracker-supporting frame 114, at 320, and provided with a short arm 321 which reaches beneath and contacts with the projecting end-part of re-play spring-valve 312, said arm terminating in a bend which extends beneath and swings against the under side of port-block 322. A spring 323 acts upon finger 319 to yieldingly hold the bent end-part of arm 321 swung against port-block 322, in which position said arm presses spring-valve 312 away from the re-play port 324 which it controls. Port 324 will be thus uncovered at all times, excepting only when tracker 40 is in operative contact with a selected record and that record has been wound sufficiently upon its respective take-up spool to cover the slot therein, moving and holding finger 319 out of said slot, against the action of spring 323 (Fig. 18).

Port 324 is connected with valve-action 144, through conduits 325 and 326 (Fig. 22), and with valve-action 142, through a branch conduit 327. Valve-action 144 controls the operation of a re-play pneumatic 328, forming part of the reverse-control unit 329, which unit also comprises a companion re-roll pneumatic 330, similar to pneumatic 328 but arranged oppositely thereto and connected with valve-action 143, for control thereby through conduit 316. The movable leaf of re-play pneumatic 328 is provided with a swinging hook-arm 331, and the movable leaf of re-roll pneumatic 330 is similarly provided with a corresponding hook-arm 332. Each of the hook-arms 331 and 332 act upon the respective opposite ends of a centrally pivoted swinging valve 333, the arrangement of these parts being such that, upon the collapse of each pneumatic 328 and 330, the corresponding hook-arms 331 and 332 will engage with and move the respective end of valve 333, the alternate collapse of the two pneumatics thus effecting the swinging of the valve in alternately opposite directions, each hook-arm slipping off from the respective end of the valve at the end of its movement thereof, thus releasing itself therefrom and permitting the reverse movement of the valve while the respective pneumatic remains collapsed. Valve 333 controls three atmospheric inlet-ports 334, 335 and 336. Inlet-port 334 communicates with conduit 315, leading to valve-action 143, and is covered by valve 333 upon the collapse of re-play pneumatic 328. Inlet-port 335 communicates with conduit 326, leading to valve-action 144, and is covered by valve 333 upon the collapse of re-roll pneumatic 330. Inlet-port 336 communicates with conduit 281, leading to valve-action 145, and is covered by valve 333 upon the collapse of re-play pneumatic 328.

Resuming, now, the description of the operation of the parts thus far described, and assuming that the re-rolling operation is in progress, such operation will continue until the record has been nearly, but not entirely, unwound from the take-up spool. Before the record can be drawn from its hooked engagement with said take-up spool, the forward end-part of the record will be backed away from its position covering slot 311, and finger 319 will be immediately thrown into the slot by the action of spring 323. This action of spring 323 will also throw arm 321 into engagement with re-play spring-valve 312 and lift it to uncover port 324 and admit atmospheric air to valve-actions 142 and 144, through conduit 325 and branch conduit 327, and through conduit 326, respectively, and the bent end-part of arm 321 will stop against port-block 322. The resultant operation of valve-action 142 will connect air-chamber 42 of contact-box 36 with air-pump 17, through conduits 314 and 309, ready to control the playing of the musical instrument upon the passing of a record across tracker 40, in the manner hereinbefore explained, and the resultant simultaneous operation of valve-action 144 will effect the collapse of re-play pneumatic 328 by connecting it with air-pump 17, through conduit 337. The collapse of pneumatic 328 will effect the swinging of the valve 333 to open inlet-port 335 and close inlet-ports 334 and 336. The opening of inlet-port 335 will admit atmospheric air to the conduits 325, 326 and 327, which are already being supplied with atmospheric air through re-play valve port 324, thus insuring the continued operation of valve-actions 142 and 144 after re-play valve 312 has been closed, which closing occurs almost immediately upon the forward movement of the record and the resultant covering of slot 311. Meanwhile, the closing of inlet-ports 334 and 336 has cut off the admission of atmospheric air to conduits 315 and 281, respectively, and, unless these conduits receive atmospheric air through the other inlet-ports communicating therewith, valve-actions 143 and 145 will be rendered inopertive, and the expansion of the several pneumatics controlled by these valve-actions immediately follows. Re-roll tracker-aperture 288 being at this time closed by the record (and there being, presumably, no reason for operating push-button 263 to energize electro-magnets 261 and 262), atmospheric air will be entirely cut off from re-roll valve-action 143 and it will be rendered inoperative, as just mentioned; the expansion of restoring-pneumatic 268 will allow universal bar 264 to return to inactive position; the expansion of re-roll pneumatic 330 will allow its hook arm 332 to engage the respective end of valve 333, ready for the next re-rolling operation; the expansion of re-roll pneumatic 109 will allow spring 108 to disengage re-roll clutch-pins 111 and 112 and at the same time, through rod 161, lower the driving pinion 102 into engagement with take-up spool gear 105; and these parts will be in position for the re-playing of the same selection. However, assuming for the moment that no other selections have been previously registered and that, therefore, none of the latches 213 are in released position, the spring-pressed valves 227 are holding all of the inlet-ports 229 closed and, in addition, latch-lever 236 has been allowed to engage lug 240 on the switch-arm 241. Consequently, atmospheric air will be entirely cut off from conduit 281 and valve-action 145 will be rendered inoperative, as just mentioned; the expansion of retriever-pneumatic 255 will effect the opening of main line switch 24, stopping the operation of the entire mechanism; the expansion of power-pneumatic 123 will successively allow spring-valve 138 to close, swing frame 114 and driving pinion 102 out of operative position and out of the path of movement of all of the parts upon drum 48, until stud-roller 119 rests against stop 159, and effect the closing of spring-valve 134; and the expansion of re-roll cut-off pneumatic 296 will effect the opening of switch 284 and the disconnection of ports 285 and 290.

If, in the short interval between the expansion of restoring-pneumatic 268 and the expansion of retriever-pneumatic 255 (which is slightly delayed by the air-tension remaining therein during the comparatively slow expansion of the inter-connected power-pneumatic 123 and re-roll cut-off pneumatic 296), the push-button 196 representing the selection last played should be operated, or if other selections were registered, the respective spring-pressed valves 227 would be open and, in addition, latch-lever 236 would be held from engaging lug 240 on the switch-arm 241. So, in case the push-button 196 representing the selection last played should be operated at the opportune moment related above, the closing of port 336 by the aforesaid collapse of re-play pneumatic 328 will fail to cut off atmospheric air from conduit 281, since that conduit will be served with atmospheric air through the unchanged position of D-valve 199, channel 278 not having been moved from its position connecting conduit 281 with the last employed and now re-opened selecting conduit 279. In such an instance, therefore, pneumatics 123, 255 and 296 would remain collapsed, and the re-playing of the last-played selection would immediately proceed. In case other selections have been registered, and a re-selection has not been registered at the opportune moment, as above set forth, the operation of all the parts will be just the same as that described in connection with the stopping of the entire mechanism, but the operation will not stop, since the one or more released latches 213 will hold open their respective spring-pressed valves 227 and will prevent latch-lever 236 from engaging lug 240 on the switch-arm 241, so that the expansion of retriever-pneumatic 255 does not effect the opening of the main line switch 24. The expansion of power-pneumatic 123 and of re-roll cut-off pneumatic 296 continues until arm 130 on the movable side 122 of power-pneumatic 123 meets with and closes spring-valve 134, cutting off the admission of atmospheric air to valve-action 137, rendering such valve-action inoperative and allowing pneumatic 73 to expand, under the influence of tension-spring 74, and effect the engagement of clutch-members 69 and 70. Drum 48 thereupon begins to rotate and, with it, D-valve 199 and pin-cylinder 200, and the rotation of these parts will continue until channel 278 "finds" or encounters the first port 275 which has been selectively provided with atmospheric air through the opening of its spring-pressed valve 227, upon which the cycle of operations continues throughout the playing and re-rolling of the selected record, all as hereinbefore explained.

Coming, now, to a description of the controller-indicator and the electrical connections associated therewith, it may be observed that Figure 1 illustrates the employment of two sets of manually operable selective push-buttons 196, one set being shown as located within the controlling mechanism cabinet 15 and the other set appearing in the portable unit 338, shown as positioned upon a table in a room distant from both the musical instrument 1 and the cabinet 15. Furthermore, it has been mentioned that a plurality of controller-indicators may be employed, and either fixedly or movably connected with the controlling mechanism, as desired. In Figure 1, the unit 338, being distant from the musical instrument 1, is shown as connected with the controlling mechanism cabinet 15 by a separate cable, while, in Figure 23, the diagrammatic arrangement of the parts illustrates the connection of the controller-indicator 338 (at the lower left-hand corner of the figure) as it would be connected if located at the musical instrument, the wires from the controller-indicator extending through the single conduit-cable 714 connecting the musical instrument with the cabinet 15.

The controller-indicator unit 338 (Figs. 1, 19, 20 and 21) comprises a box having an inclined forward face 339 provided with a plurality of transparent push-buttons 196 and 263. The eight push-buttons 196 are shown arranged, one above the other, at one side of face 339 and provision is made for removably holding a chart or program 340, upon which is displayed, at the side of each push-button 196, the title (and other data, if desired) pertaining to the musical composition which may be caused to be played upon the musical instrument upon the selective manual operation of the respective push-button, the records for which compositions are carried upon the record-carrying magazine or drum 48 within the controlling mechanism cabinet 15. The single push-button 263 is shown arranged, apart from the other push-buttons, at the lower central part of face 339.

As hereinbefore stated in connection with the description of the tempo-adjusting indexes 175, drum 48 is provided with a series of numbers, consecutively arranged for convenience, one near each of the eight take-up spools 55, and, while these numbers serve to identify each record carried by the drum with its respective tempo-adjusting index, they also serve in properly placing the records upon the drum according to the order in which the titles may be arranged upon the chart or program 340.

The controlling effects produced by the selective manual operation of the several push-buttons 196 and those produced by the operation of push-button 263 have been already set forth in considerable detail, and it is only necessary to mention that the upper one of the push-buttons 196 is connected to register the selection of the record attached to the take-up spool numbered "1" upon the record-carrying magazine or drum 48, and so on down, in consecutive order, with respect to the other push-buttons 196 and around the drum with respect to the other records positioned thereupon.

All of the push-buttons in the controller-indicator unit 338 are transparent, each comprising a small glass "bull's-eye" secured upon the forwardly presented end of a tubular mounting 341, which projects through an opening in face 339, passes through and is secured in an opening in the free end-part of a leaf-spring contact 342, and extends rearwardly therefrom to surround the forward end-part of a small electric switchboard lamp 343, so that the light from each lamp shall illuminate only its respective transparent push-button. Leaf-spring contacts 342 are arranged, one above the other, to extend horizontally across the inner side of face 339, the fixed end-parts of said contacts being secured upon said inner side and connected individually, through short extension wires 344, with corresponding selecting-wires 354. A universal contact-plate 345 is arranged within the box, slightly to the rear of contacts 342 and extending across the free end-parts thereof, so that, upon pressing each of the push-buttons 196, the free end-parts of the respective contacts will engage said contact-plate and effect the closing of the individual electric circuits. A separate contact-plate 346 is positioned similarly with respect to the separately arranged leaf-spring contact of the push-button 263, and is connected with contact-plate 345 by a wire 347. Lamps 343 are each removably supported in spring contact-clips 348 and 349, the set 349 being mounted upon a base-plate 350 of insulating material, which base-plate is secured in position within the box in a plane parallel with, but spaced away from, face 339. The contact-clips 348 which contact with one pole of all of the lamps are connected together, those for the lamps pertaining to push-buttons 196 preferably constituting flexible fingers forming part of the universal contact-plate 345, but the contact-clips 349 contacting with the other pole of each of said lamps are separate from each other and are each connected individually with corresponding lamp-wires 351 which, together with the selecting-wires 354, extend through the cable connecting the unit 338 with the controlling mechanism cabinet 15 and are there connected with devices to be presently described. The contact-clips 348 and 349 for the lamp pertaining to push-button 263 are connected, one (348) through wires 352 and 347 (Fig. 21) with universal contact-plate 345, and the other (349) with a wire 353 which constitutes one of the aforesaid lamp-wires 351. Universal contact-plate 345 is connected, through wires 347 and 352, with a feed-wire 355 which also extends through the cable connecting the unit 338 with the controlling mechanism cabinet 15.

Referring, now, to Figures 3, 5 and 23, and more particularly to Figure 23, it will be observed that the wires from the controller-indicator unit 338 end within the cabinet 15 upon a terminal-board 356, selecting-wires 354 being connected to binding-posts 357, lamp-wires 351 to binding-posts 358, and feed-wire 355 to binding-post 359. Similar selecting-wires 360 and a feed-wire 361 are also connected with binding-posts 357 and 359, respectively, extending from the set of push-buttons 196 located within the cabinet 15, and it will be understood that wires from additional controller-indicators may be connected upon the terminal-board in a like manner.

Before describing in detail the connections of the lamp circuits, it may be well to explain that the arrangement is such that, upon pressing any one of the selecting push-buttons 196, the resultant closing of the main line switch 24 and starting of air-pump 17 will be immediately indicated by the lighting of the lamp illuminating push-button 263 and this lamp, termed the pilot light, will remain lighted so long as the air-pump continues in operation. Furthermore, at or about the time the playing of the selected musical composition begins (selected by the pressing of the aforesaid push-button 196), the lamp illuminating the respective selecting push-button will be lighted, and will remain lighted until the re-winding of the respective record has been completed. If the same push-button 196 should be operated at the opportune moment hereinbefore described, or if one or more other selections have been previously registered by the operation of other push-buttons 196, the pilot light will not be extinguished (as it would otherwise be) upon the completion of the re-winding operation, since the switch 24 will not be opened and the air-pump 17 will continue in operation for the playing of the next selection. When the record representing the previously selected musical composition has been re-wound, the lamp illuminating the respective push-button 196 will be extinguished, and when, in its numerical order, the next selection is about to be played, the push-button 196 for that selection will be illuminated.

It will thus be seen that the pilot light illuminating push-button 263 indicates whether or not the mechanism is in operation, while the individual illumination of the several selecting push-buttons indicates the title of the musical composition which is being played, or which is about to be played. Thus, a glance at the controller-indicator will apprise anyone as to whether or not the mechanism is in operation and as to the title of the musical composition to which they may be listening.

Positioned in this instance upon the air-pump 17, is a small pneumatic 362 (Fig 22), which is in constant pneumatic communication with chamber 23, through conduit 363 (Figs. 9, 10 and 22), and which is, therefore, held continually collapsed during the operation of the air-pump. The office of this pneumatic 362 is simply that of controlling the switch 364 (Figs. 22 and 23) for the pilot light circuit, the collapse of the pneumatic effecting the closing of the switch, and the expansion of the pneumatic allowing the switch to open.

A commutator-switch 365 (Figs. 2, 4 and 23), having a rotatable contact-finger 366 and eight contact-points 367 therefor, controls the several individual electric circuits for the lamps which separately illuminate the eight selecting push-buttons 196 of the controller-indicator unit 338. Contact-finger 366 is secured upon a short shaft 368 having an arm 369 which is engaged by a forked arm 370 carried upon the shaft 371 which supports one of the bevel-gears 183 and the sprocket 184, which has already been described as connected for synchronous rotation with the drum 48. Contact-finger 366 is electrically connected, by a wire 372 (Fig. 23), with the switch 284, which is controlled, as hereinbefore described, by the re-roll cut-off pneumatic 296, and contact-points 367 are each separately connected, by wires 373, with binding-posts 358 on the terminal-board 356.

The positive pole of the secondary side of the transformer 47 is connected by feed-wire 374, with binding-post 359 on terminal-board 356 (Fig. 23), and the electric circuits for the several lamps 343 in the controller-indicator unit 338 are controlled by the commutator-switch in the following manner: Feed-wire 355 extends from binding-post 359, through the cable connecting the controller-indicator unit 338 with the controlling mechanism cabinet 15, and through wires 352 and 347 (Fig. 21), to universal contact-plate 345 and the individual contact-clips 348 for one pole of all the lamps 343. From these several contact-clips 348, the several lamp-circuits extend through the respective lamps 343, individual contact-clips 349 and lamp-wires 351, back through the cable to binding-posts 358, and thence through wires 373 to the respective contact-points 367 on the commutator-switch 365. As contact-finger 366 is rotated, it contacts successively with contact-points 367 and closes the respective lamp-circuits, through wire 372, switch 284, "ground" 375, and thence to the negative pole of the secondary side of the transformer 47, through ground-wire 376. Contact-finger 366 is rotated in synchronism with the drum 48 by the same gearing which effects the synchronous rotation of cage 180 carrying tempo-indexes 175. As each record is brought into operative position with respect to the tracker 40, by the hereinbefore described rotation of drum 48, contact-finger 366 is simultaneously brought into contact with the respective contact-point 367 and, if switch 284 were closed, the several lamps would be successively lighted and extinguished as the respective records were moved into and past their operative positions. It will be remembered, however, that the closing of switch 284 is effected by the comparatively slow collapse of re-roll cut-off pneumatic 296, and the illumination of the respective push-button 196 is therefore delayed until after the drum 48 has been locked in position and the forward movement of the corresponding record has begun.

Considering, now, the operation of the entire mechanism in connection with the electric circuits diagrammed in Figure 23, upon pressing one of the selecting push-buttons 196, the respective electro-magnet 195 will be energized, the electric circuit therefor being as follows: from the positive pole of the secondary side of transformer 47, through feed-wire 374 to binding-post 359, through feed-wire 355, and through wires 352 and 347 (Fig. 21), to universal contact-plate 345, through leaf-spring contact 342, extension-wire 344 (Fig. 21), and wire 354 to binding-post 357, through magnet-wire 377 to electro-magnet 195, through plate 197 and base-plate 198 to ground 375, and thence through ground-wire 376 back to the negative pole of the secondary side of transformer 47.

This energization of the respective electro-magnets 195 will act, as hereinbefore described, to close the main line switch 24, and the electric motor 18 will be supplied with driving current through the wires 378 and 379. The primary side of transformer 47 may be connected in circuit with electric motor 18, if desired. It receives electric current through wires 380 and 381.

The starting of electric motor 18 operates air-pump 17 and begins the rotation of drum 48; pneumatic 362 will be immediately collapsed to close switch 364 and cause the pilot-light to illuminate transparent push-button 263, the pilot-light circuit being as follows: from the positive pole of the secondary side of transformer 47, through feed-wire 374 to binding-post 359, through feed-wire 355 to the contact-clip 348 for the pilot-light lamp, through the pilot-light lamp and its individual contact-clip 349 and through wire 353 (one of lamp-wires 351) to binding-post 358, through wire 384 to switch 364 and ground 375, and thence through ground-wire 376 back to the negative pole of the secondary side of transformer 47.

The rotation of drum 48 continues until the selected record has been brought into operative position with respect to tracker 40, at which point the rotation of the drum is stopped. Contact-finger 366 will have been rotated in synchronism with drum 48, and the aforesaid stopping of the drum will find the contact-finger positioned in contact with the contact-point 367 corresponding to the selected and positioned record. Tracker 40 is now moved into operative contact with the selected record, drum 48 is locked in position, driving pinion 102 is brought into mesh with the respective take-up spool gear 105, and the forward or playing movement of the record across the tracker begins. Simultaneously with the aforesaid movement of tracker 40, re-roll cut-off pneumatic 296 begins to collapse and (stricture 313 having been adjusted to properly time the speed of such collapsing movement) the switch 284 will be closed thereby at or about the time when the record has been sufficiently advanced to cover slot 311, all as hereinbefore described.

This closing of switch 284 completes the electric circuit for the lamp 343 which illuminates the respective transparent selective push-button 196, the circuit being as follows: from the positive pole of the secondary side of transformer 47, through feed-wire 374 to binding-post 359, through feed-wire 355, and wires 352 and 347 (Fig. 21) to universal contact-plate 345, through the respective contact-clip 348, lamp 343, individual contact-clip 349, and wire 351 to binding-post 358, through the respective wire 373 and corresponding contact-point 367 to contact-finger 366, through wire 372 to switch 284 and ground 375, and thence through ground-wire 376 back to the negative pole of the secondary side of transformer 47.

As the record is advanced across tracker 40, the various perforations therein will register with their respective tracker-apertures and effect the operation of the corresponding flexible contact-fingers 35 in contact-box 36, closing the electric circuits for, and effecting the energization of, electro-magnets 13 to control the playing of the musical instrument 1. The circuits for these electro-magnets are as follows: from the positive pole of the secondary side of transformer 47, through feed-wire 374 to binding-post 359, through feed-wire 355 to magnet-rail 9, through the respective electro-magnets 13 and magnet-wires 14 to binding-posts 33 of contact-box 36, through the respective wires 34 and operated contact-fingers 35 to contact-bar 43, through wire 44 to binding-post 45, and through return-wire 46 back to the negative pole of the secondary side of transformer 47.

The purpose and operative effect of push-button 263 have been already described. The circuit for this push-button is as follows: from the positive pole of the secondary side of transformer 47, through feed-wire 374 to binding-post 359, through feed-wire 355 and wire 352 (Fig. 21) to contact-plate 346, through leaf-spring contact 342 and the respective wire 354 to binding-post 357, through magnet-wire 382 to electro-magnets 261 and 262, through wire 383 to switch 284 and ground 375, and thence through ground-wire 376 back to the negative pole of the secondary side of transformer 47.

I claim:

1. The combination, with an automatic musical instrument having note-sounding devices and pneumatically operable means for actuating them, of a multi-record controller for controlling the operation of said instrument comprising a cabinet separate from said instrument and provided with means for supporting a plurality of records and for propelling any selected one thereof, an air-pump, and connections extending between said instrument and said cabinet through which the operation of said actuating means may be controlled from any one of the records supported and propelled by said record supporting and propelling means and through which said actuating means is provided with operating pneumatic power from said air-pump.

2. The combination, with an automatic musical instrument having note-sounding devices and pneumatically operable means for actuating them, of a device for controlling the operation of said instrument comprising a cabinet separate from said instrument and provided with means for supporting and propelling a record, a record supported by the last said means, an air-pump and an electric motor located within said cabinet, driving connections from said electric motor to said air-pump and to said record supporting and propelling means, and connections extending between said instrument and said cabinet through which the operation of said actuating means is controlled from said record and through which said actuating means is provided with operating pneumatic power from said air-pump.

3. The combination, with an automatic musical instrument having note-sounding devices and pneumatically operable means for actuating them, of a multi-record controller for controlling the operation of said instrument comprising a cabinet separate from said instrument and provided with means for supporting a plurality of records and for propelling any selected one thereof, an air-pump and an electric motor located within said cabinet, driving connections from said electric motor to said air-pump and to said record supporting and propelling means, and connections extending between said instrument and said cabinet through which the operation of said actuating means may be controlled from any one of the records supported and propelled by said record supporting and propelling means and through which said actuating means is provided with operating pneumatic power from said air-pump.

4. The combination, with an automatic musical instrument having note-sounding devices and pneumatically operable means for actuating them, of a multi-record controller separate from said instrument comprising an air-pump, record-supporting means and a plurality of records supported thereby, and means extending between said instrument and said controller through which said actuating means are supplied with operating pneumatic power from said air-pump and through which the operation of said actuating means may be controlled from any selected one of said plurality of records.

5. The combination, with an automatic musical instrument having note-sounding devices and pneumatically operable, electrically controllable means for actuating them, of a multi-record controller separate from said instrument comprising an air-pump, record-supporting means and a plurality of records supported thereby, and means extending between said instrument and said controller through which said actuating means are supplied with operating pneumatic power from said air-pump and through which the operation of said actuating means may be electrically controlled from any selected one of said plurality of records.

6. The combination, with an automatic musical instrument having note-sounding devices and pneumatically operable, electrically controllable means for actuating them, of a device separate from said instrument comprising an air-pump and means for supporting and propelling a record, a record supported thereby, and a conduit-cable extending between said instrument and said device through which said actuating means are supplied with operating pneumatic power from said air-pump and through which the operation of said actuating means is electrically controlled from said record.

7. The combination, with an automatic musical instrument having note-sounding devices and pneumatically operable, electrically controllable means for actuating them, of a device separate from said instrument comprising an air-pump and means for supporting and propelling a record, a record supported thereby, and a conduit-cable extending between said instrument and said device; said conduit-cable having a flexible hollow conduit core connected with said air-pump and with said actuating means for conveying operating pneumatic power from said air-pump to said actuating means, and flexible electric conductors surrounding said core and connected with means located in said device through which the operation of said actuating means is electrically controlled from said record.

8. The combination, with an automatic musical instrument having note-sounding devices and pneumatically operable, electrically controllable means for actuating them, of a device separate from said instrument comprising an air-pump, means for supporting and propelling a record, a record supported thereby, a pneumatic tracker for co-operation with said record, electric contact-devices operated by pneumatic power provided by said air-pump and controlled in operation from said tracker, and a conduit-cable extending between said instrument and said device; said conduit-cable having a flexible hollow conduit core connected with said air-pump and with said actuating means for conveying operating pneumatic power from said air-pump to said actuating means, and flexible electric conductors surrounding said core and connected with said contact-devices through which the operation of said actuating means is electrically controlled from said record.

9. The combination, with an automatic musical instrument having note-sounding devices and means for actuating them, and a device operating to control the operation of said actuating means comprising means for supporting and propelling a record, of an indicator automatically controlled by said device for indicating when said device is in operation.

10. The combination, with an automatic musical instrument having note-sounding devices and means for actuating them, and a device operating to control the operation of said actuating means comprising means for supporting and propelling a record, of electro-pneumatically controlled means for indicating whether or not said device is in operation.

11. The combination, with an automatic musical instrument having note-sounding devices and pneumatically operable means for actuating them, and a device operating to effect the operation of said actuating means comprising an air-pump, of electrically operable means pneumatically controlled in operation by said air-pump for indicating when said device is in operation.

12. The combination, with an automatic musical instrument having note-sounding devices and means for actuating them, and a multi-record controller comprising means for supporting a plurality of records and selectively moving them into operative position to control the operation of said actuating means, of an indicator automatically controlled by said controller for indicating when a selected record has been moved into operative position.

13. The combination, with an automatic musical instrument having note-sounding devices and means for actuating them, and a multi-record controller comprising record-supporting means, a plurality of records supported thereby, and means for selectively moving said records into operative position to control the operation of said actuating means, of an indicator automatically controlled by said controller for indicating which of said records has been moved into operative position.

14. The combination, with an automatic musical instrument having note-sounding devices and means for actuating them, and a multi-record controller comprising record-supporting means, a plurality of records supported thereby, and means for selectively propelling any desired one of said records to control the operation of said actuating means, of an indicator automatically controlled by said controller for indicating which of said records is being so propelled.

15. The combination, with an automatic musical instrument having note-sounding devices and means for actuating them, and a multi-record controller operating to control the operation of said actuating means comprising means for supporting a plurality of records and selectively moving them into operative position, of an indicating device automatically controlled by said controller for separately indicating when said controller is in operation and when a selected record has been moved into operative position.

16. The combination, with an automatic musical instrument having note-sounding devices and means for actuating them, and a multi-record controller operating to control the operation of said actuating means comprising record-supporting means, a plurality of records supported thereby, and means for selectively moving said records into operative position, of an indicating device automatically controlled by said controller for separately indicating when said controller is in operation and which of said records has been moved into operative position.

17. The combination, with an automatic musical instrument having note-sounding devices and means for actuating them, and a multi-record controller operating to control the operation of said actuating means comprising record-supporting means, a plurality of records supported thereby, and means for selectively propelling any desired one of said records, of an indicating device automatically controlled by said controller for separately indicating when said controller is in operation and which of said records is being so propelled.

18. The combination, with an automatic musical instrument having note-sounding devices and means for actuating them, and a device operating to control the operation of said actuating means comprising means for supporting and propelling a record, of a controller-indicator for controlling the operation of said device and for indicating when said device is in operation.

19. The combination, with an automatic musical instrument having note-sounding devices and means for actuating them, a device operating to control the operation of said actuating means comprising means for supporting and propelling a record, and a record supported thereby, of a controller-indicator for controlling the operation of said device to effect the propulsion of said record and for indicating when such propulsion is being effected.

20. The combination, with an automatic musical instrument having note-sounding devices and means for actuating them, a device operating to control the operation of said actuating means comprising means for supporting and propelling a record, and a record supported thereby, of a controller-indicator for controlling the operation of said device to effect the propulsion of said record, having means for separately indicating when said device is in operation and when such propulsion of said record is being effected.

21. The combination, with an automatic musical instrument having note-sounding devices and means for actuating them, and a device operating to control the operation of said actuating means comprising means for supporting and propelling a record, of a controller-indicator comprising a transparent push-button for controlling the operation of said device and indicating means for illuminating said push-button.

22. The combination, with an automatic musical instrument having note-sounding devices and means for actuating them, and a device operating to control the operation of said actuating means comprising means for supporting and propelling a record, of a controller-indicator comprising a plurality of transparent push-buttons for controlling the operation of said device and means for separately illuminating said push-buttons to indicate different operations.

23. The combination, with an automatic musical instrument having note-sounding devices and means for actuating them, and a device operating to control the operation of said actuating means comprising means for supporting and propelling a record, of a controller-indicator comprising a transparent push-button for controlling the operation of said device and means automatically controlled through the operation of said device for illuminating said push-button to indicate the operation of said device.

24. The combination, with an automatic musical instrument having note-sounding devices and means for actuating them, and a device operating to control the operation of said actuating means comprising means for supporting and propelling a record, of a controller-indicator comprising a plurality of transparent push-buttons for controlling the operation of said device and means automatically controlled through the operation of said device for separately illuminating said push-buttons to indicate a plurality of operations effective in said device.

25. The combination, with an automatic musical instrument having note-sounding devices and means for actuating them, a device operating to control the operation of said actuating means comprising means for supporting, propelling, and re-winding a record, and a record supported thereby, of a controller-indicator for controlling the operation of said device comprising a plurality of transparent push-buttons for separate manual operation, one to effect the propulsion and another to effect the re-winding of said record, and means automatically controlled from said device to illuminate one of said push-buttons to indicate when said device is in operation and to illuminate another of said push-buttons when the propulsion of said record is being effected.

26. The combination, with an automatic musical instrument having note-sounding devices and means for actuating them, and a multi-record controller for controlling the operation of said actuating means comprising record-supporting means and a plurality of records supported thereby, of a controller-indicator having manually controllable means for selectively causing any desired one of said records to be played upon said instrument and automatically controlled means for indicating which of said records is being played.

27. The combination, with an automatic musical instrument having note-sounding devices and means for actuating them, and a multi-record controller comprising a movable carrier, a plurality of records supported upon said carrier, and means for moving said carrier to bring each of said records into operative position to control the operation of said actuating means, of a controller-indicator having manually controllable means for selectively causing any desired one of said records to be moved by said carrier into operative position and automatically controlled means for indicating which of said records has been so positioned.

28. The combination, with an automatic musical instrument having note-sounding devices and means for actuating them, and a multi-record controller for controlling the operation of said actuating means comprising record-supporting means and a plurality of records supported thereby, of a controller-indicator having a plurality of transparent push-buttons for selectively causing any desired one of said records to be played upon said instrument and automatically controlled means for separately illuminating each of said push-buttons to indicate which of said records is being played.

29. The combination, with an automatic musical instrument having note-sounding devices and means for actuating them, and a multi-record controller comprising a movable carrier, a plurality of records supported upon said carrier, and means for moving said carrier to bring each of said records into operative position to control the operation of said actuating means, of a controller-indicator having a plurality of transparent push-buttons for selectively causing any desired one of said records to be moved by said carrier into operative position and automatically controlled means for separately illuminating each of said push-buttons to indicate which of said records has been so positioned.

30. The combination, with an automatic musical instrument having note-sounding devices and means for actuating them, and a multi-record controller operating to control the operation of said actuating means comprising record-supporting means and a plurality of records supported thereby, means for propelling any one of said records, and means for re-winding each of said records, of a controller-indicator having a plurality of transparent push-buttons for selectively causing any desired one of said records to be propelled, an additional transparent push-button for causing the propulsion of a record to stop and the re-winding thereof to begin, and automatically controlled means for illuminating said additional push-button to indicate when the multi-record controller is in operation and for separately illuminating each of said plurality of push-buttons to indicate when a selected record is being propelled.

31. The combination, with an automatic musical instrument having note-sounding devices and means for actuating them, and a multi-record controller operating to control the operation of said actuating means comprising record-supporting means and a plurality of records supported thereby, means for propelling any one of said records, and means for re-winding each of said records, of a controller-indicator having a plurality of transparent push-buttons for selectively causing any desired one of said records to be propelled, an additional transparent push-button for causing the propulsion of a record to stop and the re-winding thereof to begin, and automatically controlled means for illuminating said additional push-button to indicate when the multi-record controller is in operation and for individually illuminating each of said plurality of push-buttons to indicate which one of said records is being propelled.

32. The combination, with an automatic musical instrument having note-sounding devices and means for actuating them, of a multi-record controller comprising record-supporting means and a plurality of records supported thereby, means for propelling any one of said records to control the operation of said actuating means, means for registering the selection of any one of said records and for causing a selected record to be propelled, means for cancelling such registration and stopping the propulsion of the respective record, and manually controllable means for separately effecting the operation of said registering means and of said cancelling means.

33. The combination, with an automatic musical instrument having note-sounding devices and means for actuating them, of a multi-record controller comprising record-supporting means and a plurality of records supported thereby, means for propelling any one of said records to control the operation of said actuating means, means for registering the selection of a number of said records and for causing such registered selected records to be propelled, one after another, means for simultaneously cancelling all of such registrations and stopping the propulsion of a record, and manually controllable means for separately effecting the operation of said registering means and of said cancelling means.

34. The combination, with an automatic musical instrument having note-sounding devices and means for actuating them, of a device for controlling the operation of said actuating means comprising record-supporting means, a take-up spool, a tracker, and means supporting said tracker for bodily movement thereof into and from operative position interposed between said record-supporting means and said take-up spool.

35. The combination, with an automatic musical instrument having note-sounding devices and means for actuating them, of a device for controlling the operation of said actuating means comprising record winding and re-winding spools, a record extending from one to the other of said spools, a tracker, and means operating to move said tracker between said spools into and from operative contact with the under surface of said record.

36. The combination, with an automatic musical instrument having note-sounding devices and means for actuating them, of a device for controlling the operation of said actuating means comprising means for supporting and propelling a record, a tracker, means for moving said record supporting and propelling means, and means for moving said tracker; the path of movement of said record supporting and propelling means crossing the path of movement of said tracker.

37. The combination, with an automatic musical instrument having note-sounding devices and means for actuating them, of a device for controlling the operation of said actuating means comprising a record take-up spool, a tracker, means for moving said take-up spool into and from operative position, and means for moving said tracker; the path of movement of said take-up spool crossing the path of movement of said tracker.

38. The combination, with an automatic musical instrument having note-sounding devices and means for actuating them, of a device for controlling the operation of said actuating means comprising record-supporting means and a record supported thereby, a tracker, means for moving said record-supporting means to bring said record into operative position, and a swinging frame upon which said tracker is supported; said frame being pivotally supported to swing said tracker into and from the path of movement of said record.

39. The combination, with an automatic musical instrument having note-sounding devices and means for actuating them, of a multi-record controller comprising a movable carrier, a plurality of records supported upon said carrier, means for moving said carrier to bring each of said records into operative position to control the operation of said actuating means, a movable tracker, and means operating to move said tracker between two of said records into operative contact with one of said records.

40. The combination, with an automatic musical instrument having note-sounding devices and means for actuating them, of a multi-record controller comprising a movable carrier for supporting a plurality of records and having a take-up spool for each of the records supported thereby, a plurality of records supported upon said carrier, means for moving said carrier to bring each of said records into operative position to control the operation of said actuating means, a movable tracker, and means operating to move said tracker between two of said take-up spools into operative contact with the positioned one of said records.

41. The combination, with an automatic musical instrument having note-sounding devices and means for actuating them, of a device for controlling the operation of said actuating means comprising means for supporting and propelling a record, a record supported thereby, a tracker, and a movable frame upon which said tracker is mounted; said frame being supported to provide movement of said tracker toward and away from said record and to provide lateral movement of said tracker with respect to said record.

42. The combination, with an automatic musical instrument having note-sounding devices and means for actuating them, of a device for controlling the operation of said actuating means comprising means for supporting and propelling a record, a record supported thereby, a tracker, a movable frame upon which said tracker is mounted, means operating to move said frame in one direction to effect the operative contact of said tracker with said record, and means operating to move said frame in a transverse direction to effect lateral movement of said tracker with respect to said record.

43. The combination, with an automatic musical instrument having note-sounding devices and means for actuating them, of a device for controlling the operation of said actuating means comprising means for supporting and propelling a record, a record supported thereby, a tracker, a movable frame upon which said tracker is mounted, means operating to move said frame in one direction to effect the operative contact of said tracker with said record, and means controlled in operation by said record during the operative contact of said tracker therewith operating to move said frame in another direction to effect lateral movement of said tracker with respect to said record.

44. The combination, with an automatic musical instrument having note-sounding devices and means for actuating them, of a device for controlling the operation of said actuating means comprising means for supporting and propelling a record, a record supported thereby, a tracker, a movable frame upon which said tracker is mounted, means operating to move said frame in one direction to effect the operative contact of said tracker with said record, and means carried by said tracker and controlled in operation by said record during the operative contact of said tracker therewith operating to move said frame in another direction to effect lateral movement of said tracker with respect to said record.

45. The combination, with an automatic musical instrument having note-sounding devices and means for actuating them, of a device for controlling the operation of said actuating means comprising means for supporting and propelling a record, a record supported thereby, a tracker, a frame upon which said tracker is mounted, and a shaft upon which said frame is supported; said shaft providing an axis upon which said frame swings and being slidably mounted to permit lateral movement of said shaft, said frame and said tracker with respect to said record.

46. The combination, with an automatic musical instrument having note-sounding devices and means for actuating them, of a device for controlling the operation of said actuating means comprising means for supporting and propelling a record, a record supported thereby, a tracker, a frame upon which said tracker is mounted, and a shaft upon which said frame is secured; said shaft being rotatably and slidably journaled in fixed bearings to permit both swinging and lateral movement of said frame and said tracker with respect to said record.

47. The combination, with an automatic musical instrument having note-sounding devices and means for actuating them, of a device for controlling the operation of said actuating means comprising means for supporting and propelling a record, a record supported thereby, a tracker, a frame upon which said tracker is mounted, a shaft upon which said frame is supported, and means operating to move said tracker into and from operative contact with said record; said shaft providing an axis upon which said frame swings, and said tracker-moving means acting to swing said frame upon said axis.

48. The combination, with an automatic musical instrument having note-sounding devices and means for actuating them, of a device for controlling the operation of said actuating means comprising means for supporting and propelling a record, a record supported thereby, a tracker, a frame upon which said tracker is mounted, a shaft upon which said frame is supported, and means operating to move said tracker laterally with respect to said record; said shaft being slidably mounted in bearings to permit endwise movement of said shaft, and said tracker-moving means acting upon said shaft to slide it in said bearings.

49. The combination, with an automatic musical instrument having note-sounding devices and means for actuating them, of a device for controlling the operation of said actuating means comprising means for supporting and propelling a record, a record supported thereby, a tracker, a frame upon which said tracker is mounted, a shaft upon which said frame is supported, means operating to swing said frame to move said tracker into and from operative contact with said record, and means operating to slide said shaft to move said frame and said tracker laterally with respect to said record.

50. The combination, with an automatic musical instrument having note-sounding devices and means for actuating them, of a device for controlling the operation of said actuating means comprising means for supporting and propelling a record, a record supported thereby, a tracker, a frame upon which said tracker is mounted, a rotatably and slidably mounted shaft upon which said frame is secured, means operating to rotate said shaft to swing said frame and said tracker to move said tracker into and from operative contact with said record, and means operating to slide said shaft endwise to move said frame and said tracker laterally to effect the lateral movement of said tracker with respect to said record.

51. The combination, with an automatic musical instrument having note-sounding devices and means for actuating them, of a device for controlling the operation of said actuating means comprising means for supporting and propelling a record, a record supported thereby, a tracker, a frame upon which said tracker is mounted, a shaft upon which said frame is supported, said frame being supported upon said shaft for swinging movement and said shaft being supported in bearings for endwise movement, means operating to swing said frame to move said tracker into and from operative contact with said record, and means controlled in operation during the operative contact of said tracker with said record operating to effect the endwise movement of said shaft and the lateral movement of said frame and said tracker with respect to said record.

52. The combination, with an automatic musical instrument having note-sounding devices and means for actuating them, of a device for controlling the operation of said actuating means comprising means for supporting and propelling a record, a record supported thereby, a tracker, a frame upon which said tracker is mounted, a shaft upon which said frame is supported, means operating to swing said frame to move said tracker into and from operative contact with said record, and means controlled in operation during the operative contact of said tracker with said record operating to effect the endwise movement of said shaft and the lateral movement of said frame and said tracker with respect to said record; said frame being supported upon said shaft for swinging movement, said shaft being supported in bearings for endwise movement, and said means operating to effect the endwise movement of said shaft comprising a pair of pneumatics acting in opposite directions upon the ends of said shaft to effect such endwise movement thereof.

53. The combination, with an automatic musical instrument having note-sounding devices and means for actuating them, of a device for controlling the operation of said actuating means comprising means for supporting and propelling a record, a record supported thereby, a tracker, a frame upon which said tracker is mounted, a shaft upon which said frame is secured, said shaft being rotatably and slidably journaled in fixed bearings, means operating to rotate said shaft to swing said frame and move said tracker into and from operative contact with said record, and means controlled in operation during the operative contact of said tracker with said record operating to effect the endwise movement of said shaft and the lateral movement of said frame and said tracker with respect to said record; the last said means comprising a pair of pneumatics acting in opposite directions upon the ends of said shaft to slide it endwise in its bearings, and means carried by said tracker and controlled by said record for controlling the operation of said pneumatics.

54. The combination, with an automatic musical instrument having note-sounding devices and means for actuating them, of a device for controlling the operation of said actuating means comprising a record-spool, a record, a movable tracker, control-means movable with said tracker, and means operating to move said tracker into co-operative association with said record and place said control-means in co-operative association with said record-spool.

55. The combination, with an automatic musical instrument having note-sounding devices and means for actuating them, of a device for controlling the operation of said actuating means comprising a record take-up spool, a record, a movable tracker, control-means movable with said tracker, and means operating to move said tracker into co-operative association with said record and place said control-means in co-operative association with said take-up spool.

56. The combination, with an automatic musical instrument having note-sounding devices and means for actuating them, of a device for controlling the operation of said actuating means comprising a record-spool, a slot therein, a record, a movable tracker, control-means comprising a finger movable with said tracker, and means operating to move said tracker into co-operative association with said record and place said finger in co-operative association with said slot.

57. The combination, with an automatic musical instrument having note-sounding devices and means for actuating them, of a device for controlling the operation of said actuating means comprising record winding and re-winding spools, a record extending from one to the other of said spools, a slot circumferentially disposed in one of said spools and arranged to be covered and uncovered by said record, a movable tracker, movable control-means having an operating finger, and means operating to move said tracker between said spools into and from operative contact with the under surface of said record and to move said control-means to allow said finger to enter said slot and to be operated by the covering and uncovering of said slot by said record when said tracker is in operative contact with said record.

58. A multi-record controller for automatic musical instruments comprising a movable carrier, a plurality of record-spools supported upon said carrier, a plurality of records extending between said record-spools, means operating to move said carrier to bring each of said records into operative position, a movable tracker, control-means movable with said tracker, and means operating after one of said records has been brought into operative position to move said tracker into co-operative association with said one of said records and to place said control-means in co-operative association with one of said record-spools pertaining to said one of said records.

59. A multi-record controller for automatic musical instruments comprising a movable carrier, a plurality of record take-up spools supported upon said carrier, means operating to move said carrier to bring each of said take-up spools into operative position, control-means movable with respect to said carrier, and means operating after one of said take-up spools has been moved into operative position to move said control-means into co-operative association with said one of said take-up spools.

60. A multi-record controller for automatic musical instruments comprising a movable carrier, a plurality of record-spools supported upon said carrier, a slot in each of said record-spools, means operating to move said carrier to bring each of said record-spools into operative position, control-means movable with respect to said carrier and having an operating finger, and means operating after one of said record-spools has been moved into operative position to move said control-means to bring the operating finger thereof into position for co-operation with the slot in said one of said record-spools.

61. The combination, with an automatic musical instrument having note-sounding devices and means for actuating them, of a multi-record controller comprising a movable carrier, a plurality of records supported upon said carrier, means operating to move said carrier to bring each of said records into operative position to control the operation of said actuating means, a movable tracker, means operating to move said tracker into operative contact with one of said records, and means through which such movement of said tracker insures the accurate operative positioning of the record with which said tracker is moved into operative contact.

62. The combination, with an automatic musical instrument having note-sounding devices and means for actuating them, of a multi-record controller comprising a movable carrier, a plurality of records supported upon said carrier, means operating to move said carrier to bring each of said records into operative position to control the operation of said actuating means, a movable tracker, means operating to move said tracker into operative contact with one of said records, and means through which such movement of said tracker locks said carrier in position.

63. The combination, with an automatic musical instrument having note-sounding devices and means for actuating them, of a multi-record controller comprising a movable carrier, a plurality of records supported upon said carrier, means operating to move said carrier to bring each of said records into operative position to control the operation of said actuating means, a tracker, a movable support for said tracker, means operating to move said support to place said tracker in operative contact with one of said records, and means through which such movement of said support locks said carrier in accurate position; the last said means comprising a notch and a notch-engaging detent, said notch and said detent being separately movable, one located upon said movable carrier and the other located upon said movable support.

64. The combination, with an automatic musical instrument having note-sounding devices and means for actuating them, of a multi-record controller comprising a movable carrier having a plurality of notches, a plurality of records supported upon said carrier, one record for each of said notches, means operating to move said carrier to bring each of said records into operative position to control the operation of said actuating means, a tracker, a movable support for said tracker having a notch-engaging detent, and means operating to move said support to place said tracker in operative contact with one of said records, such movement of said support effecting the engagement of said detent with one of said notches.

65. A multi-record controller for automatic musical instruments comprising a movable carrier, a plurality of records supported upon said carrier, means for moving said carrier to selectively bring any desired one of said records into operative position, means for propelling one of said records when it has been brought into operative position, and means for controlling the speed at which a record will be propelled; the last said means comprising a bodily movable speed-adjusting device having an adjustable abutment, an adjustable speed-controlling device not movable with said speed-adjusting device having a beveled portion for operative engagement with said abutment, and means for moving said speed-adjusting device in synchronism with the movement of said carrier to bring said abutment into operative engagement with said beveled portion of said speed-controlling device co-incident with the bringing of one of said records into operative position.

66. A multi-record controller for automatic musical instruments comprising a movable carrier, a plurality of records supported upon said carrier, means for moving and for stopping the movement of said carrier to selectively position any desired one of said records in operative position, means for propelling one of said records when it has been so positioned, and means for adjustably determining the speed at which a record will be propelled; the last said means comprising a movable support, a plurality of speed-adjusting devices carried by said support, one of each of said records and each having an adjustable abutment, an adjustable speed-controlling device having a cam-shaped portion for operative engagement with each said adjustable abutment, and means for moving said support in synchronism with the movement of said carrier to position one of said speed-adjusting devices in operative position co-incident with the positioning of one of said records in operative position, said cam-shaped portion of said speed-controlling device riding upon and off from operative engagement with said abutments as the respective speed-adjusting devices are moved into and from operative position by the movement of said support.

67. The combination, with an automatic musical instrument having note-sounding devices and means for actuating them, and a device operating to control the operation of said actuating means comprising means for supporting and propelling a record, of means for indicating whether or not said controlling device is in operation comprising an electrically operable indicator and a switch in circuit therewith, said switch being automatically controlled by the operation of said controlling device.

68. The combination, with an automatic musical instrument having note-sounding devices and means for actuating them, and a device operating to control the operation of said actuating means comprising an air-pump and means for supporting and propelling a record, of means for indicating whether or not said controlling device is in operation comprising an electrically operable indicator, an electric switch in circuit with said indicator, and a pneumatic for operating said switch; said pneumatic being pneumatically connected with said air-pump.

69. The combination, with an automatic musical instrument having note-sounding devices and means for actuating them, and a multi-record controller comprising a record-support, a plurality of records supported thereby, and means for selectively propelling any desired one of said records to control the operation of said actuating means, of means for indicating which of said records is being so propelled comprising a plurality of electrically operable indicators and a selective switch in circuit therewith, said switch being automatically operated by said multi-record controller to selectively control the electric operation of said indicators.

70. The combination, with an automatic musical instrument having note-sounding devices and means for actuating them, and a multi-record controller, comprising a record-support, a plurality of records supported thereby, and means for causing any selected one of said records to be brought into operation to control the operation of said actuating means and effect the playing of the respective musical composition upon said instrument, of means for indicating which of said compositions is being played comprising a chart identifying one or more of said compositions and a plurality of electrically operable indicators associated with said chart, one indicator for each composition identified upon said chart, and a selective switch in circuit with said indicators, said switch being automatically operated by said multi-record controller to selectively effect the operation of said indicators as the respective records are brought into controlling operation.

71. A multi-record controller for automatic musical instruments comprising a movable carrier, a plurality of records supported upon said carrier, means for moving said carrier to selectively bring any desired one of said records into operative position, and means for indicating which of said records has been brought into operative position comprising a plurality of indicators, one for each of said records, and a device for selectively energizing each of said indicators comprising a movable member and means for moving said member in synchronism with the movement of said carrier.

72. A multi-record controller for automatic musical instruments comprising a movable carrier, a plurality of records supported upon said carrier, means for moving said carrier to selectively bring any desired one of said records into operative position, and means for indicating which of said records has been brought into operative position; said indicating means comprising a plurality of electrically controllable indicators, one for each of said records, a multi-point switch comprising a movable contact and a plurality of contact-points traversed thereby, each of said contact-points being in circuit with one of said indicators, and means for moving said contact in synchronism with the movement of said carrier to contact with the respective one of said contact-points which pertains to the record which has been brought into operative position.

73. The combination, with an automatic musical instrument having note-sounding devices and means for actuating them, and a multi-record controller comprising a movable carrier, a plurality of records supported upon said carrier, means for moving said carrier to bring any desired one of said records into operative position, means for propelling one of said records when it has been so positioned, and means through which the propulsion of the record which has been so positioned will control the operation of said actuating means and effect the playing of the respective musical composition upon said instrument, of means for identifying the musical composition which is being played comprising a chart listing each of the several musical compositions represented by said plurality of records, a plurality of electric lamps arranged adjacent to said chart, one lamp for each composition listed thereupon, a multi-point switch comprising a movable contact and a plurality of contact-points traversed thereby, one contact-point for each of said plurality of records and each contact-point being connected in open circuit with one of said plurality of lamps, and means for moving said contact in synchronism with the movement of said carrier to contact with the respective one of said contact-points which pertains to the record which is controlling the operation of said actuating means and close the electric circuit for the lamp connected therewith.

74. A multi-record controller for automatic musical instruments comprising a movable carrier; a plurality of records supported upon said carrier; means operating to move said carrier to bring each of said records into operative position; pneumatically operable means operating to stop the movement of said carrier; a plurality of selectively operable devices; and means connected for movement in synchronism with the movement of said carrier operating to separately render each of said devices effective to control the operation of said pneumatically operable means.

75. A multi-record controller for automatic musical instruments comprising a movable carrier; a plurality of records supported upon said carrier; means operating to move said carrier to bring each of said records into operative position; pneumatically operable means operating to stop the movement of said carrier; a plurality of selectively operable devices, one for each of said records, operating to register the selection of a desired record; and means connected for movement in synchronism with the movement of said carrier operating to separately render each of said devices effective to control the operation of said pneumatically operable means as the respective records are brought into operative position.

76. A multi-record controller for automatic musical instruments comprising a movable carrier; a plurality of records supported upon said carrier; disconnectible means operating to move said carrier to bring each of said records into operative position; pneumatically operable means operating to effect the disconnection of said carrier-moving means; a plurality of selectively operable valves; and means connected for movement in synchronism with the movement of said carrier operating to separately render each of said valves effective to control the operation of said pneumatically operable means.

77. A multi-record controller for automatic musical instruments comprising a movable carrier; a plurality of records supported upon said carrier; disconnectible means operating to move said carrier to bring each of said records into operative position; pneumatically operable means operating to effect the disconnection of said carrier-moving means; a plurality of selectively operable valves, one for each of said records; a valve-device comprising a plurality of relatively movable members; a plurality of ports arranged in one member of said valve-device, each of said ports being controlled by one of said valves; a single port arranged in another member of said valve-device and connected with said pneumatically operable means; and means for moving one member of said valve-device in synchronism with the movement of said carrier to effect the successive registration of said single port with each of said plurality of ports as each of said records is brought into operative position.

78. A multi-record controller for automatic musical instruments comprising a movable carrier; a plurality of records supported upon said carrier; disconnectible means operating to move said carrier to bring each of said records into operative position; pneumatically operable means operating to effect the disconnection of said carrier-moving means; a plurality of selectively operable valves, one for each of said records; a plurality of valve-ports, one controlled by each of said valves; a valve-device comprising a fixed member and a rotatable member; a plurality of ports circularly arranged in said fixed member, each of said ports being connected with one of said valve-ports; a circular groove in said fixed member, connected with said pneumatically operable means; a radial groove in said rotatable member, positioned therein to register with said circular groove and to register consecutively with each of said ports in said fixed member as said rotatable member is rotated; and means operating to rotate said rotatable member in synchronism with the movement of said carrier.

79. A multi-record controller for automatic musical instruments comprising a movable carrier; a plurality of records supported upon said carrier; disconnectible means operating to move said carrier to bring each of said records into operative position; a pneumatic operating to control the connection and disconnection of said carrier-moving means; a plurality of selectively operable devices, one for each of said records; and movable means operating automatically upon the operation of one of said devices to selectively render said one of said devices effective to control the operation of said pneumatic.

80. A multi-record controller for automatic musical instruments comprising a movable carrier; a plurality of records supported upon said carrier; disconnectible means operating to move said carrier to bring each of said records into operative position; disconnectible means operating to propel any one of said records when it has been brought into operative position; a pneumatic operating to control the connection and disconnection of each of said disconnectible means; a plurality of selectively operable devices, one for each of said records; and movable means operating automatically upon the operation of one of said devices to selectively render said one of said devices effective to control the operation of said pneumatic.

81. A multi-record controller for automatic musical instruments comprising a movable carrier; a plurality of records supported upon said carrier; disconnectible means operating to move said carrier to bring each of said records into operative position; a first pneumatic operating to control the connection and disconnection of said carrier-moving means; disconnectible means operating to propel any one of said records when it has been brought into operative position; a second pneumatic operating to control the operation of said first pneumatic and to control the connection and disconnection of said propelling means; a plurality of selectively operable devices, one for each of said records; and movable means operating automatically upon the operation of one of said devices to selectively render said one of said devices effective to control the operation of said second pneumatic.

82. A multi-record controller for automatic musical instruments comprising a movable carrier; a plurality of records supported upon said carrier; disconnectible means operating to move said carrier to bring each of said records into operative position; disconnectible means operating to propel any one of said records when it has been brought into operative position; a movable tracker; a pneumatic operating to control the connection and disconnection of each of said disconnectible means and to control the movement of said tracker; a plurality of selectively operable devices, one for each of said records; and movable means operating automatically upon the operation of one of said devices to selectively render said one of said devices effective to control the operation of said pneumatic.

83. A multi-record controller for automatic musical instruments comprising a movable carrier; a plurality of records supported upon said carrier; disconnectible means operating to move said carrier to bring each of said records into operative position; movable means co-operating with said carrier to accurately position any one of said records in operative position; a pnuematic operating to control the connection and disconnection of said carrier-moving means and to control the movement of said positioning means; a plurality of selectively operable devices, one for each of said records; and movable means operating automatically upon the operation of one of said devices to selectively render said one of said devices effective to control the operation of said pneumatic.

84. A multi-record controller for automatic musical instruments comprising a movable carrier; a plurality of records supported upon said carrier; disconnectible means operating to move said carrier to bring each of said records into operative position; locking means co-operating with said carrier to lock said carrier against movement; a pneumatic operating to control the connection and disconnection of said carrier-moving means and to control the operation of said locking means; a plurality of selectively operable devices, one for each of said records; and movable means operating automatically upon the operation of one of said devices to selectively render said one of said devices effective to control the operation of said pneumatic.

85. A multi-record controller for automatic musical instruments comprising a movable carrier; a plurality of records supported upon said carrier; disconnectible means operating to move said carrier to bring each of said records into operative position; disconnectible means operating to propel any one of said records in forward and reverse directions when it has been brought into operative position; a pneumatic operating to control the connection and disconnection of each of said disconnectible means; a plurality of selectively operable devices, one for each of said records; and movable means operating automatically upon the operation of one of said devices to selectively render said one of said devices effective to control the operation of said pneumatic.

86. A multi-record controller for automatic musical instruments comprising a movable carrier; a plurality of records supported upon said carrier; disconnectible means operating to move said carrier to bring each of said records into operative position; disconnectible means operating to propel any one of said records when it has been brought into operative position: a movable tracker; an air-chest having pneumatically operable devices controlled in operation from said tracker; a pneumatic operating to control the connection and disconnection of each of said disconnectible means, the movement of said tracker, and the supply of operating pneumatic power to said air-chest; a plurality of selectively operable devices, one for each of said records; and movable means operating automatically upon the operation of one of said devices to selectively render said one of said devices effective to control the operation of said pneumatic.

87. A multi-record controller for automatic musical instruments comprising a record-support; a plurality of records supported thereby; record-propelling means separately applicable to each of said records; a pneumatic connected with said record-propelling means operating to control the application thereof; a plurality of selectively operable devices, one for each of said records and each capable of being rendered effective to control the operation of said pneumatic; and movable means operating automatically upon the operation of one of said devices to selectively render said one of said devices effective to control the operation of said pneumatic and thereby control the application of said record-propelling means to effect the propulsion of the particular one of said records corresponding to said one of said devices.

88. A multi-record controller for automatic musical instruments comprising a record-support; a plurality of records supported thereby; record-propelling means applicable to each of said records; an electric switch; means for closing said switch; a releasable latch engaging said switch and holding it open; means operating to release said latch to allow said switch to be closed; a pneumatic operating upon said latch to permit the re-engagement thereof with said switch; a plurality of selectively operable devices, one for each of said records and each controlling the operation of said latch-releasing means; and movable means operating automatically upon the closing of said switch to selectively render each of said devices effective to control the application of said record-propelling means to effect the propulsion of a particular one of said records and to control the operation of said pneumatic.

89. A multi-record controller for automatic musical instruments comprising a record-support; a plurality of records supported thereby; record-propelling means applicable to each of said records; a pneumatic connected to control the application of said record-propelling means; an electric switch; means acting upon said switch to close the same; a releasable and bodily movable latch engageable with said switch for moving and holding said switch open; means operating to release said latch; a pneumatic connected with said latch for effecting the bodily movement thereof into switch-engaging position; a plurality of selectively operable devices, one for each of said records and each controlling the operation of said latch-releasing means; and movable means operating automatically upon the closing of said switch to selectively render each of said devices effective to control the operation of said pneumatics.

90. A multi-record controller for automatic musical instruments comprising a record-support; a plurality of records supported thereby; record-propelling means applicable to each of said records; a pneumatic connected to control the application of said record-propelling means; an electric switch; a spring acting upon said switch to close the same; a releasable and bodily movable latch engageable with said switch for moving and holding said switch open against the action of said spring; means operating to release said latch to allow said spring to close said switch; a pneumatic operating to bodily move said latch into switch-engaging position; a plurality of selectively operable devices, one for each of said records and each controlling the operation of said latch-releasing means; and movable means operating automatically upon the closing of said switch to selectively render each of said devices effective to control the operation of said pneumatics.

91. A multi-record controller for automatic musical instruments comprising a record-support; a plurality of records supported thereby; record-propelling means applicable to each of said records; a first pneumatic connected to control the application of said record-propelling means; an electric switch; a first spring acting upon said switch to close the same; a releasable and bodily movable latch engageable with said switch for moving and holding said switch open against the action of said spring; means operating to release said latch to allow said spring to close said switch; a second pneumatic operating to bodily move said latch into switch-engaging position; a second spring acting upon said latch to effect its engagement with said switch when said latch is moved into switch-engaging position; a third spring acting upon said latch in opposition to its bodily movement by said second pneumatic, said third spring being more powerful than said first spring; a plurality of selectively operable devices, one for each of said records and each controlling the operation of said latch-releasing means; and movable means operating automatically upon the closing of said switch to selectively render each of said devices effective to control the operation of said pneumatics.

92. A multi-record controller for automatic musical instruments comprising a record-support; a plurality of records supported thereby; record-rewinding means separately applicable to each of said records; a pneumatic connected with said record-re-winding means operating to control the application thereof; a plurality of selectively operable devices, one for each of said records; a separately operable device capable of being rendered effective to control the operation of said pneumatic; and movable means operating automatically upon the operation of one of said selectively operable devices to render said separately operable device effective to control the operation of said pneumatic and thereby control the application of said record-re-winding means to effect the re-winding of the particular one of said records corresponding to said one of said selectively operable devices.

93. A multi-record controller for automatic musical instruments comprising a record-support; a plurality of records supported thereby; record-propelling means and record-re-winding means separately applicable to each of said records; a plurality of selectively operable devices, one for each of said records; movable means operating automatically upon the operation of one of said devices to selectively render said one of said devices effective to control the application of said record-propelling means to effect the propulsion of the particular one of said records corresponding to said one of said devices; and a separately operable device operating to interrupt the propulsion of said particular one of said records and to control the application of said record-re-winding means to effect the re-winding of said particular one of said records.

94. A multi-record controller for automatic musical instruments comprising a record-support; a plurality of records supported thereby; record-propelling means and record-re-winding means separately applicable to each of said records; a plurality of selectively operable devices, one for each of said records and each separately connectible to control the application of said record-propelling means; a separately operable device to control the application of said record-re-winding means; and movable means operating automatically upon the operation of one of said selectively operable devices to selectively connect said one of said devices and thereby render it effective to control the application of said record-propelling means to effect the propulsion of a particular one of said records, and also operating to selectively provide for the application of said record-re-winding means to said particular one of said records under the control of said separately operable device.

95. A multi-record controller for automatic musical instruments comprising a record-support; a plurality of records supported thereby; record-propelling means and record-re-winding means separately applicable to each of said records; a first pneumatic connected with said record-propelling means operating to control the application thereof;

a second pneumatic connected with said record-re-winding means operating to control the application thereof; a plurality of selectively operable devices, one for each of said records and each capable of being rendered effective to control the operation of said first pneumatic; a separately operable device capable of being rendered effective to control the operation of said second pneumatic; and movable means operating automatically upon the operation of one of said selectively operable devices to selectively render said one of said devices effective to control the operation of said first pneumatic and the application of said record-propelling means to a particular one of said records, and also operating to render said separately operable device effective to control the operation of said second pneumatic and the application of said record-re-winding means to said particular one of said records.

96. A multi-record controller for automatic musical instruments comprising a movable carrier; a plurality of records supported upon said carrier; means operating to move said carrier to bring each of said records into operative position; record-propelling means and record-re-winding means separately applicable to each of said records; a plurality of selectively operable devices, one for each of said records, each operable to control the operation of said carrier-moving means and separately connectible to control the stopping of said carrier and the application of said record-propelling means; a separately operable device to control the application of said record-re-winding means; and movable means connected for movement in synchronism with the movement of said carrier, said movable means operating to selectively connect each of said selectively operable devices to control the stopping of said carrier and the application of said record-propelling means as the respective records are brought into operative position, and also operating to selectively provide for the application of said record-re-winding means to said respective records.

97. A multi-record controller for automatic musical instruments comprising a movable carrier; a plurality of records supported upon said carrier; disconnectible means operating to move said carrier to bring each of said records into operative position; record-propelling means and record-re-winding means separately applicable to each of said records when it is brought into operative position; an electric motor connected for driving said carrier-moving means, said record-propelling means, and said record-re-winding means; a switch controlling the electric circuit for said motor; a plurality of selectively operable devices, one for each of said records; means through which the operation of any one of said devices effects the closing of said switch; and movable means connected for movement in synchronism with the movement of said carrier; said movable means operating to selectively connect each of said selectively operable devices to control the disconnection of said carrier-moving means and the application of said record-propelling means as the respective records are brought into operative position.

98. A multi-record controller for automatic musical instruments comprising a movable carrier; a plurality of records supported upon said carrier; record-propelling means and record-re-winding means separately applicable to each of said records; disconnectible means operating to move said carrier to bring each of said records into position for the application of said record-propelling means and record-re-winding means thereto; a plurality of selectively operable devices, one for each of said records and each separately connectible to control the disconnection of said carrier-moving means and the application of said record-propelling means; means through which the operation of any one of said devices effects the movement of said carrier by said carrier-moving means; movable means operating automatically upon the operation of one of said devices to selectively connect said one of said devices to effect the disconnection of said carrier-moving means and the application of said record-propelling means when the corresponding one of said records has been brought into position; a separately operable device connectible to control the application of said record-re-winding means; and means operating to connect said separately operable device to permit its operation to effect the application of said record-re-winding means to said one of said records.

99. A multi-record controller for automatic musical instruments comprising a movable carrier; a plurality of records supported upon said carrier; record-propelling means and record-re-winding means separately applicable to each of said records; disconnectible means operating to move said carrier to bring each of said records into position for the application of said record-propelling means and record-re-winding means thereto; a plurality of selectively operable devices, one for each of said records and each separately connectible to control the disconnection of said carrier-moving means and the application of said record-propelling means; means through which the operation of any one of said devices effects the movement of said carrier by said carrier-moving means; movable means operating automatically upon the operation of one of said devices to selectively connect said one of said devices to effect the disconnection of said carrier-moving means and the application of said record-propelling means when the corresponding one of said records has been brought into position; a separately operable device which may be rendered effective to control the application of said record-re-winding means; and means operating to render said separately operable device effective as aforesaid with respect to said one of said records and to delay such rendering until after the application of said record-propelling means to said one of said records has been effected.

100. A multi-record controller for automatic musical instruments comprising a movable carrier; a plurality of records supported upon said carrier; record-propelling means and record-re-winding means separately applicable to each of said records; disconnectible means operating to move said carrier to bring each of said records into position for the application of said record-propelling means and record-re-winding means thereto; a plurality of selectively operable devices, one for each of said records and each separately connectible to control the disconnection of said carrier-moving means and the application of said record-propelling means; means through which the operation of any one of said devices effects the movement of said carrier by said carrier-moving means; movable means operating automatically upon the operation of one of said devices to selectively connect said one of said devices to effect the disconnection of said carrier-moving means and the application of said record-propelling means to propel the corresponding one of said records when it has been brought into position; a separately operable device connectible to control the disconnection of said record-propelling means and the application of said record-re-winding means; and means operating to connect said separately operable device to permit its operation to effect the disconnection of said record-propelling means from said one of said records and the application of said record-re-winding means thereto.

101. A multi-record controller for automatic musical instruments comprising a movable carrier; a plurality of records supported upon said carrier; record-propelling means and record-re-winding means separately applicable to each of said records; disconnectible means operating to move said carrier to bring each of said records into position for the application of said record-propelling means and record-re-winding means thereto; a plurality of selectively operable devices, one for each of said records and each separately connectible to control the disconnection of said carrier-moving means and the application of said record-propelling means; means through which the operation of any one of said devices effects the movement of said carrier by said carrier-moving means; movable means operating automatically upon the operation of one of said devices to selectively connect said one of said devices to effect the disconnection of said carrier-moving means and the application of said record-propelling means to propel the corresponding one of said records when it has been brought into position; a separately operable device which may be rendered effective to control the disconnection of said record-propelling means and the application of said record-re-winding means; and delayed-action means operating automatically upon the operation of one of said selectively operable devices to render said separately operable device effective as aforesaid only after the propulsion of said one of said records has begun.

102. A multi-record controller for automatic musical instruments comprising a record-support; a plurality of records supported thereby; record-propelling means and record-re-winding means separately applicable to each of said records; a plurality of selectively operable devices, one for each of said records and each separately connectible to control the application of said record-propelling means; a separately operable device which may be rendered effective to control the application of said record-re-winding means; movable means operating automatically upon the operation of one of said selectively operable devices to selectively connect said one of said devices to render it effective to control the application of said record-propelling means to effect the propulsion of a particular one of said records; and a slow-acting pneumatic also operating automatically upon the operation of said one of said selectively operable devices to render said separately operable device effective to control the application of said record-re-winding means to said particular one of said records.

103. A multi-record controller for automatic musical instruments comprising a movable carrier; a plurality of records supported upon said carrier; means operating to move said carrier to bring each of said records into operative position; a plurality of selectively operable devices, one for each of said records and each operating to control the operation of said carrier-moving means to determine which of said records shall be brought into operative position; and means operating after a selected record has been brought into operative position to render the respective selectively operable device operatively ineffective; the last said means comprising a movable abutment-member having a plurality of abutments, one for each of said records, a plurality of abutment-engaging dogs, one for each of said abutments and each operatively connected with one of said selectively operable devices, means operating to move said abutment-member in synchronism with the movement of said carrier to bring one of said abutments into position for engagement with its respective dog as the corresponding record is brought into operative position, and means operating after said one of said abutments has been brought into position as aforesaid to move said respective dog to fulcrum upon said one of said abutments and act through its operative connection with its respective selectively operable device to render said device operatively ineffective.

104. A multi-record controller for automatic musical instruments comprising a movable carrier; a plurality of records supported upon said carrier; means operating to move said carrier to bring each of said records into operative position; a plurality of selectively operable devices, one for each of said records and each operating to control the operation of said carrier-moving means to determine which of said records shall be brought into operative position; and means operating after a selected record has been brought into operative position to render the respective selectively operable device operatively ineffective; the last said means comprising a plurality of individually releasable latches, each acting upon release to render a corresponding one of said selectively operable devices effective, a movable abutment-member having a plurality of abutments, one for each of said records, a plurality of abutment-engaging dogs, one for each of said abutments and each operatively connected with one of said latches, means operating to move said abutment-member in synchronism with the movement of said carrier to bring one of said abutments into position for engagement with its respective dog as the corresponding record is brought into operative position, and means operating after said one of said abutments has been brought into position as aforesaid to move said respective dog to fulcrum upon said one of said abutments and act through its connection with its latch to restore said latch to latched position and thereby render the corresponding one of said selectively operable device operatively ineffective.

105. A multi-record controller for automatic musical instruments comprising a movable carrier; a plurality of records supported upon said carrier; means operating to move said carrier to bring each of said records into operative position; a plurality of selectively operable devices, one for each of said records and each operating to control the operation of said carrier-moving means to determine which of said records shall be brought into operative position; and means operating after a selected record has been brought into operative position to restore the respective selectively operable device to inoperative position; the last said means comprising a plurality of individually releasable latches, each operatively associated with a corresponding one of said selectively operable devices, a movable abutment-member having a plurality of abutments, one for each of said records, a plurality of abutment-engaging dogs, one for each of said abutments and each operatively connected with one of said latches, means operating to move said abutment-member in synchronism with the movement of said carrier to bring one of said abutments into position for engagement with its respective dog as the corresponding record is brought into operative position, and means operating after said one of said abutments has been brought into position as aforesaid to move said respective dog to fulcrum upon said one of said abutments and act through its connection with its latch to move said latch and restore said one of said selectively operable devices to inoperative position.

106. A multi-record controller for automatic musical instruments comprising a movable carrier; a plurality of records supported upon said carrier; pneumatically operable means operating to control the movement of said carrier to selectively position each of said records; a plurality of selectively operable devices comprising a plurality of valves, one for each of said records and each opening to control the operation of said pneumatically operable means to determine which of said records shall be positioned; and means operating upon the positioning of a selected record to render the respective selectively operable device operatively ineffective; the last said means comprising a plurality of individually operable valve-controlling devices, one for each of said valves, a movable abutment-member having a plurality of abutments, one for each of said records, a plurality of abutment-engaging dogs, one for each of said abutments and each operatively connected with one of said valve-controlling devices, means operating to move said abutment-member in synchronism with the movement of said carrier to position one of said abutments for engagement with its respective dog when the selected record has been positioned, and means operating after said one of said abutments has been positioned as aforesaid to move said respective dog to fulcrum upon said one of said abutments and operate its connected valve-controlling device to close the respective valve and thereby render the corresponding one of said selectively operable devices operatively ineffective.

107. A multi-record controller for automatic musical instruments comprising a movable carrier; a plurality of records supported upon said carrier; pneumatically operable means operating to control the movement of said carrier to selectively position each of said records; a plurality of selectively operable devices comprising a plurality of valves, one for each of said records and each opening to control the operation of said pneumatically operable means to determine which of said records shall be positioned; and means operating upon the positioning of a selected record to render the respective selectively operable device operatively ineffective; the last said means comprising a plurality of individually operable valve-controlling devices, one for each of said valves, a movable abutment-member having a plurality of abutments, one for each of said records, a plurality of abutment-engaging dogs, one for each of said abutments and each operatively connected with one of said valve-controlling devices, means operating to move said abutment-member in synchronism with the movement of said carrier to position one of said abutments for engagement with its respective dog when the selected record has been positioned, means common to all of said dogs operating to move said respective dog to fulcrum upon said one of said abutments and operate its connected valve-controlling device to close the respective valve and thereby render the corresponding one of said selectively operable devices operatively ineffective, a pneumatic connected to said dog-operating means, and means operating to cause the operation of said pneumatic after said one of said abutments has been positioned as aforesaid.

108. A multi-record controller for automatic musical instruments comprising a record-support; a plurality of records supported thereby; record-propelling means applicable to each of said records; a plurality of selectively operable devices one for each of said records and each operating to control the application of said record-propelling means to effect the propulsion of a corresponding one of said records; and means operating after the propulsion of a record has begun to render the respective selectively operable device operatively ineffective; the last said means comprising a movable abutment-member having a plurality of abutments, one for each of said records, a plurality of abutment-engaging dogs, one for each of said abutments and each operatively connected with one of said selectively operable devices, means operating to move said abutment-member to bring one of said abutments into position for engagement with its respective dog simultaneously with the selection of a corresponding one of said records to be propelled, and means operating after said one of said abutments has been brought into position as aforesaid to move said respective dog to fulcrum upon said one of said abutments and act through its operative connection with its respective selectively operable device to render said device operatively ineffective.

109. A multi-record controller for automatic musical instruments comprising a record-support; a plurality of records supported thereby; record-propelling means applicable to each of said records; a plurality of selectively operable devices, one for each of said records and each operating to control the application of said record-propelling means to effect the propulsion of a corresponding one of said records; and means operating after the propulsion of a record has begun to render the respective selectively operable device operatively ineffective; the last said means comprising a plurality of individually releasable latches, each acting upon release to render a corresponding one of said selectively operable devices effective to control the application of said record-propelling means as aforesaid; a movable abutment-member having a plurality of abutments, one for each of said records; a plurality of abutment-engaging dogs, one for each of said abutments and each operatively connected with one of said latches; means operating to move said abutment-member to bring one of said abutments into position for engagement with its respective dog simultaneously with the selection of a corresponding one of said records to be propelled; and means operating after said one of said abutments has been brought into position as aforesaid to move said respective dog to fulcrum upon said one of said abutments and act through its connection with its latch to restore said latch to latched position and thereby render the corresponding one of said selectively operable devices operatively ineffective.

110. A multi-record controller for automatic musical instruments comprising a record-support; a plurality of records supported thereby; record-propelling means applicable to each of said records; pneumatically operable means operating to control the application of said record-propelling means; a plurality of selectively operable devices comprising a plurality of valves, one for each of said records and each opening to control the operation of said pneumatically operable means to determine which of said records shall be propelled; and means operating after the propulsion of a record has begun to render the respective selectively operable device operatively ineffective; the last said means comprising a plurality of individually operable valve-controlling devices, one for each of said valves, a movable abutment-member having a plurality of abutments, one for each of said records, a plurality of abutment-engaging dogs, one for each of said abutments and each operatively connecting with one of said valve-controlling devices, means operating to move said abutment-member to bring one of said abutments into position for engagement with its respective dog simultaneously with the selection of a corresponding one of said records to be propelled, and means operating after said one of said abutments has been brought into position as aforesaid to move said respective dog to fulcrum upon said one of said abutments and operate its connected valve-controlling device to close the respective valve.

111. A multi-record controller for automatic musical instruments comprising a record-support; a plurality of records supported thereby; record-propelling means applicable to each of said records; pneumatically operable means operating to control the application of said record-propelling means; a plurality of selectively operable devices comprising a plurality of valves, one for each of said records and each opening to control the operation of said pneumatically operable means to determine which of said records shall be propelled; and means operating after the propulsion of a record has begun to render the respective selectively operable device operatively ineffective; the last said means comprising a plurality of individually operable valve-controlling devices, one for each of said valves, a movable abutment-member having a plurality of abutments, one for each of said records, a plurality of abutment-engaging dogs, one for each of said abutments and each operatively connected with one of said valve-controlling devices, means operating to move said abutment-member to bring one of said abutments into position for engagement with its respective dog simultaneously with the selection of a corresponding one of said records to be propelled, means common to all of said dogs operating to move said respective dog to fulcrum upon said one of said abutments and operate its connected valve-controlling device to close the respective valve, a pneumatic connected to said dog-operating means, and means operating to cause the operation of said pneumatic after said one of said abutments has been positioned as aforesaid.

112. A multi-record controller for automatic musical instruments comprising a record-support; a plurality of records supported thereby; record-propelling means applicable to each of said records; a plurality of selectively operable devices, one for each of said records and each separately connectible to control the application of said record-propelling means; movable means operating automatically upon the operation of one of said selectively operable devices to selectively connect said one of said devices to render it effective to control the application of said record-propelling means to effect the propulsion of a particular one of said records; and means operating after the propulsion of a selected record has begun to render the respective selectively operable device operatively ineffective; the last said means comprising a plurality of individually releasable latches, each acting upon release to render a corresponding one of said selectively operable devices effective to control the application of said record-propelling means as aforesaid; a movable abutment-member having a plurality of abutments, one for each of said records; a plurality of abutment-engaging dogs, one for each of said abutments and each operatively connected with one of said latches; means operating to move said abutment-member in synchronism with the movement of said movable means to bring one of said abutments into position for engagement with its respective dog simultaneously with the connection of said one of said selectively operable devices as aforesaid; and means operating after the propulsion of a selected record has begun to move said respective dog to fulcrum upon said one of said abutments and act through its connection with its latch to restore said latch to latched position and thereby render the corresponding one of said selectively operable devices operatively ineffective.

113. A multi-record controller for automatic musical instruments comprising a record-support; a plurality of records supported thereby; record-propelling means applicable to each of said records; pneumatically operable means operating to control the application of said record-propelling means; a plurality of individually operable valves, one for each of said records; a plurality of ports, one controlled by each of said valves and each separately connectible to control the operation of said pneumatically operable means; a plurality of selectively operable valve-controlling devices, one for each of said valves; movable means operating automatically upon the operation of one of said selectively operable devices to selectively connect one of said ports to control the operation of said pneumatically operable means and thereby render the respective one of said valves effective to control the application of said record-propelling means to effect the propulsion of a corresponding one of said records; and means operating after the propulsion of a selected record has begun to render the respective selectively operable device operatively ineffective; the last said means comprising a movable abutment-member having a plurality of abutments, one for each of said records; a plurality of abutment-engaging dogs, one for each of said abutments and each operatively connected with one of said selectively operable valve-controlling devices; means operating to move said abutment-member in synchronism with the movement of said movable means to bring one of said abutments into position for engagement with its respective dog simultaneously with the connection of said one of said ports; and means operating after the propulsion of a selected record has begun to move said respective dog to fulcrum upon said one of said abutments and operate its connected valve-controlling device to close the respective valve.

114. A multi-record controller for automatic musical instruments comprising a record-support; a plurality of records supported thereby; record-propelling means and record-re-winding means separately applicable to each of said records; a plurality of selectively operable devices, one for each of said records and each operating to control the application of said record-propelling means to effect the propulsion of a corresponding one of said records; a separately operable device operating to control the application of said record-re-winding means; and means operating upon the application of said record-re-winding means to one of said records to render the respective selectively operable device operatively ineffective; the last said means comprising a movable abutment-member having a plurality of abutments, one for each of said records; a plurality of abutment-engaging dogs, one for each of said abutments and each operatively connected with one of said selectively operable devices; means operating to move said abutment-member to bring one of said abutments into position for engagement with its respective dog simultaneously with the selection of a corresponding one of said records to be propelled; and means operating upon the application of said record-re-winding means to said one of said records to move said respective dog to fulcrum upon said one of said abutments and act through its operative connection with its respective selectively operable device to render said device operatively ineffective.

115. A multi-record controller for automatic musical instruments comprising a record-support; a plurality of records supported thereby; record-propelling means and record-re-winding means separately applicable to each of said records; a plurality of selectively operable devices, one for each of said records and each separately connectible to control the application of said record-propelling means; a separately operable device connectible to control the application of said record-re-winding means; movable means operating automatically upon the operation of one of said selectively operable devices to selectively connect said one of said devices to render it effective to control the application of said record-propelling means to effect the propulsion of a particular one of said records and also operating to provide for the application of said record-re-winding means to effect the re-winding of said particular one of said records under the control of said separately operable device; and means operating simultaneously with the application of said record-re-winding means to render the respective one of said selectively operable devices operatively ineffective; the last said means comprising a plurality of individually releasable latches, each acting upon release to render a corresponding one of said selectively operable devices effective to control the application of said record-propelling means as aforesaid; a movable abutment-member having a plurality of abutments, one for each of said records; a plurality of abutment-engaging dogs, one for each of said abutments and each operatively connected with one of said latches; means operating to move said abutment-member in synchronism with the movement of said movable means to bring one of said abutments into position for engagement with its respective dog simultaneously with the connection of said one of said selectively operable devices as aforesaid; and means operating simultaneously with the application of said record-re-winding means as aforesaid to move said respective dog to fulcrum upon said one of said abutments and act through its connection with its latch to restore said latch to latched position and thereby render the corresponding one of said selectively operable devices operatively ineffective.

116. A multi-record controller for automatic musical instruments comprising a record-support; a plurality of records supported thereby; record-propelling means and record-re-winding means separately applicable to each of said records; a plurality of selectively operable devices, one for each of said records; means through which the operation of one of said devices will effect the application of said record-propelling means to effect the propulsion of a corresponding one of said records; means operating to stop the propulsion of a record and effect the application of said record-re-winding means thereto; means operating to render said one of said devices operatively ineffective; and means operating to cause the simultaneous operation of the last two said means.

117. A multi-record controller for automatic musical instruments comprising a record-support; a plurality of records supported thereby; record-propelling means and record-re-winding means separately applicable to each of said records; pneumatically operable means operating to control the application of said record-propelling means and said record-re-winding means; a plurality of selectively operable devices, one for each of said records; means through which the operation of one of said devices will cause the operation of said pneumatically operable means to effect the application of said record-propelling means to a corresponding one of said records; a separately operable device operating to cause the operation of said pneumatically operable means to effect the disconnection of said record-propelling means from a record and effect the application of said record-re-winding means thereto; and means controlled in operation by said pneumatically operable means to render said one of said selectively operable devices operatively ineffective.

118. A multi-record controller for automatic musical instruments comprising a movable carrier; a plurality of records supported upon said carrier; means operating to move said carrier to selectively bring each of said records into operative position; a plurality of selectively operable devices, one for each of said records and each operating to register the selection of its respective record and control the operation of said carrier-moving means to position said respective record as aforesaid; and means acting upon each of said devices and controllable at will to cancel the registration of the selection registered through its operation as aforesaid.

119. A multi-record controller for automatic musical instruments comprising a movable carrier; a plurality of records supported upon said carrier; means operating to move said carrier to selectively bring each of said records into operative position; a plurality of selectively operable devices, one for each of said records and each operating to register the selection of its respective record and control the operation of said carrier-moving means to position said respective record as aforesaid; and means acting upon all of said devices and controllable at will to cancel the registration of any registered selections.

120. A multi-record controller for automatic musical instruments comprising a movable carrier; a plurality of records supported upon said carrier; means operating to move said carrier to selectively bring each of said records into operative position; a plurality of selectively operable devices, one for each of said records and each operating to register the selection of its respective record and control the operation of said carrier-moving means to position said respective record as aforesaid, means operating automatically after a selected record has been so positioned to render the respective selectively operable device operatively ineffective and means acting upon each of said devices and controllable at will to cancel the registration of the selection registered through its operation as aforesaid.

121. A multi-record controller for automatic musical instruments comprising a movable carrier; a plurality of records supported upon said carrier; means operating to move said carrier to selectively bring each of said records into operative position; a plurality of selectively operable devices, one for each of said records and each operating to register the selection of its respective record and control the operation of said carrier-moving means to position said respective record as aforesaid; means operating automatically after each selected record has been so positioned to individually render the respective selectively operable device operatively ineffective; and means acting collectively upon all of said devices and controllable at will to cancel the registration of any registered selections.

122. A multi-record controller for automatic musical instruments comprising a record-support; a plurality of records supported thereby; record-propelling means applicable to each of said records; a plurality of selectively operable devices, one for each of said records and each operating to register the selection of its respective record and effect the application of said record-propelling means thereto; and means acting upon each of said devices and controllable at will to cancel the registration of the selection registered through its operation as aforesaid.

123. A multi-record controller for automatic musical instruments comprising a record-support; a plurality of records supported thereby; record-propelling means applicable to each of said records; a plurality of selectively operable devices, one for each of said records and each operating to register the selection of its respective record and effect the application of said record-propelling means thereto; and means acting upon all of said devices and controllable at will to cancel the registration of any registered selections.

124. A multi-record controller for automatic musical instruments comprising a record-support; a plurality of records supported thereby; record-propelling means applicable to each of said records; a plurality of selectively operable devices, one for each of said records and each operating to register the selection of its respective record and effect the application of said record-propelling means thereto; means operating automatically after the propulsion of a selected record has begun to render the respective selectively operable device operatively ineffective; and means acting upon each of said devices and controllable at will to cancel the registration of the selection registered through its operation as aforesaid.

125. A multi-record controller for automatic musical instruments comprising a record-support; a plurality of records supported thereby; record-propelling means applicable to each of said records; a plurality of selectively operable devices, one for each of said records and each operating to register the selection of its respective record and effect the application of said record-propelling means thereto; means operating automatically after the propulsion of each selected record has begun to individually render the respective selectively operable device operatively ineffective; and means acting collectively upon all of said devices and controllable at will to cancel the registration of any registered selections.

126. The combination, with an automatic musical instrument having note-sounding devices and means for actuating them, of a device for controlling the operation of said actuating means comprising a record-support; a record supported thereby; driving means; record-propelling means and record-re-winding means, each driven by said driving means and separately applicable to said record; record-controlled means operating to effect the alternate application of said record-propelling means and said record-re-winding means; and means operating automatically with the operation of said record-controlled means to control the operation of said driving means.

127. The combination, with an automatic musical instrument having note-sounding devices and means for actuating them, of a device for controlling the operation of said actuating means comprising a record-support; a record supported thereby; driving means; record-propelling means and record-re-winding means, each driven by said driving means and separately applicable to said record; record-controlled means operating to effect the alternate application of said record-propelling means and said record-re-winding means; and setting means operating automatically with the operation of said record-controlled means to continue the application of either said record-propelling means or said record-re-winding means after the record control of such application has been discontinued and to control the operation of said driving means.

128. The combination, with an automatic musical instrument having note-sounding devices and means for actuating them, of a device for controlling the operation of said actuating means comprising a record-support; a record supported thereby; driving means; record-propelling means and record-re-winding means, each driven by said driving means and separately applicable to said record; record-controlled means operating to effect the alternate application of said record-propelling means and said record-re-winding means; setting means operating automatically with the operation of said record-controlled means to continue the results effected thereby after the record control of such results has been discontinued and to control the operation of said driving means; and separately operable means operating to control the operation of said driving means.

129. The combination, with an automatic musical instrument having note-sounding devices and means for actuating them, of a device for controlling the operation of said actuating means comprising a record-support; a record supported thereby; driving means; record-propelling means and record-re-winding means, each driven by said driving means and separately applicable to said record; record-controlled pneumatically operable means operating to effect the alternate application of said record-propelling means and said record-re-winding means; and setting means operating automatically with the operation of said pneumatically operable means to continue the operation thereof after the record control thereof has been temporarily discontinued and to control the operation of said driving means; said setting means comprising a reversible valve and a pair of pneumatics acting alternately upon said valve to move it in reverse directions, the action of one of said pneumatics being effected with the operation of said pneumatically operable means to effect the application of said record-propelling means, and the action of the other of said pneumatics being effected with the operation of said pneumatically operable means to effect the application of said record-re-winding means.

130. The combination, with an automatic musical instrument having note-sounding devices and means for actuating them, of a multi-record controller for controlling the operation of said actuating means comprising a record-support, a plurality of records supported thereby, and a controller-indicator for controlling and indicating the operation of said multi-record controller; said controller-indicator comprising a chart provided with a plurality of index-entries thereupon separately indicating the several musical selections represented by said plurality of records, a plurality of transparent push-buttons arranged one adjacent each of said index-entries, a plurality of electric switches, each controlled by one of said push-buttons, a plurality of indicating means, one for each of said push-buttons and each visible through its respective push-button, electric circuit connections connected with each of said electric switches through which the selective operation of said push-buttons may cause the operation of said multi-record controller to play any desired one of said records upon said instrument, and other electric circuit connections connected with each of said indicating means through which the identification of the record being played will be indicated in connection with the respective index-entry upon said chart.

131. The combination, with an automatic musical instrument having note-sounding devices and means for actuating them, of a multi-record controller for controlling the operation of said actuating means comprising a record-support, a plurality of records supported thereby, and a controller-indicator for controlling and indicating the operation of said multi-record controller; said controller-indicator comprising a portable control-board, a chart supported upon said control-board and provided with a plurality of index-entries thereupon separately indicating the several musical selctions represented by said plurality of records, a plurality of transparent push-buttons arranged upon said control-board, one adjacent each of said index-entires upon said chart, a plurality of electric switches, each controlled by one of said push-buttons, a plurality of indicating means, one for each of said push-buttons and each visible through its respective push-button, a flexible cable extending between said multi-record controller and said controller-indicator, electric circuit connections extending through said cable and connected with each of said electric swtiches, through which the selective operation of said push-buttons may cause the operation of said multi-record controller to play any desired one of said records upon said instrument, and other electric circuit connections extending through said cable and connected with each of said indicating means, through which the identification of the record being played will be indicated by the respective indicating means in connection with the corresponding index-entry upon said chart.

In witness whereof, I have hereunto subscribed my name.

CLIFFORD H. GREEN.